US010332050B2

(12) United States Patent
Hanson

(10) Patent No.: US 10,332,050 B2
(45) Date of Patent: Jun. 25, 2019

(54) IDENTIFYING PERSONNEL-STAFFING ADJUSTMENTS BASED ON INDOOR POSITIONING SYSTEM DETECTION OF PHYSICAL CUSTOMER PRESENCE

(71) Applicant: Bank of America Corporation, Charlotte, NC (US)

(72) Inventor: Carrie Anne Hanson, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 1248 days.

(21) Appl. No.: 14/327,569

(22) Filed: Jul. 10, 2014

(65) Prior Publication Data

US 2016/0012381 A1    Jan. 14, 2016

(51) Int. Cl.
*G06Q 10/06*    (2012.01)
*H04W 4/04*    (2009.01)

(52) U.S. Cl.
CPC ...... *G06Q 10/063116* (2013.01); *H04W 4/04* (2013.01)

(58) Field of Classification Search
None
See application file for complete search history.

(56) References Cited

U.S. PATENT DOCUMENTS

| 3,808,410 A | 4/1974 | Schlesinger |
| 4,700,295 A | 10/1987 | Katsof et al. |
| 5,581,625 A * | 12/1996 | Connell ............ G06K 9/00778 348/139 |
| 5,581,630 A | 12/1996 | Bonneau, Jr. |

(Continued)

FOREIGN PATENT DOCUMENTS

KR    20090050383 A    5/2009

OTHER PUBLICATIONS

Wisniewski, Mary; "Tellers Become Guides and Storytellers in High-Tech Branches"; Apr. 14, 2014; American Banker; vol. 178 Issue 56, p. 29-29. 1 p.*

(Continued)

*Primary Examiner* — Leland Marcus
(74) *Attorney, Agent, or Firm* — Banner & Witcoff, Ltd.; Michael A. Springs

(57) ABSTRACT

A computing platform may receive a plurality of messages comprising data indicating physical presence of a plurality of customers of a financial institution at a physical banking center location of the financial institution from an indoor positioning system located at the physical banking center location of the financial institution. The computing platform may identify one or more attributes of at least a portion of the plurality of customers of the financial institution at the physical banking center location of the financial institution, and one or more adjustments to a personnel-staffing schedule for the physical banking center location of the financial institution based on at least a portion of the data indicating the physical presence of the plurality of customers of the financial institution at the physical banking center location of the financial institution and the one or more attributes of the at least a portion of the plurality of customers.

16 Claims, 10 Drawing Sheets

(56) References Cited

U.S. PATENT DOCUMENTS

| | | |
|---|---|---|
| 5,953,055 A * | 9/1999 | Huang .............. G06K 9/00228 348/149 |
| 5,991,749 A | 11/1999 | Morrill, Jr. |
| 6,513,015 B2 | 1/2003 | Ogasawara |
| 6,563,423 B2 | 5/2003 | Smith |
| 6,593,856 B1 | 7/2003 | Madau |
| 6,624,739 B1 | 9/2003 | Stobbe |
| 6,738,628 B1 | 5/2004 | McCall et al. |
| 6,845,361 B1 | 1/2005 | Dowling |
| 7,047,560 B2 | 5/2006 | Fishman et al. |
| 7,111,174 B2 | 9/2006 | Hamid |
| 7,149,533 B2 | 12/2006 | Laird et al. |
| 7,181,252 B2 | 2/2007 | Komsi |
| 7,357,316 B2 * | 4/2008 | Heckel .................. G06Q 30/02 235/375 |
| 7,466,224 B2 | 12/2008 | Ward et al. |
| 7,490,122 B2 * | 2/2009 | Horvitz ............... G06Q 10/109 706/11 |
| 7,536,316 B2 | 5/2009 | Ozer et al. |
| 7,536,722 B1 | 5/2009 | Saltz et al. |
| 7,543,738 B1 | 6/2009 | Saunders et al. |
| 7,552,800 B2 | 6/2009 | Puskala et al. |
| 7,712,657 B1 | 5/2010 | Block et al. |
| 7,774,076 B2 | 8/2010 | Skowronek |
| 7,778,855 B2 | 8/2010 | Holliday |
| 7,814,016 B2 | 10/2010 | Pranger |
| 7,904,718 B2 | 3/2011 | Giobbi et al. |
| 7,911,334 B2 | 3/2011 | Busey |
| 7,912,843 B2 | 3/2011 | Murdock et al. |
| 7,962,361 B2 | 6/2011 | Ramchandani et al. |
| 7,969,285 B2 | 6/2011 | Bauchot et al. |
| 7,979,899 B2 | 7/2011 | Guo et al. |
| 8,009,013 B1 | 8/2011 | Hirschfeld et al. |
| 8,055,551 B2 | 11/2011 | Milgramm et al. |
| 8,073,460 B1 | 12/2011 | Scofield et al. |
| 8,078,146 B2 | 12/2011 | Jayappa et al. |
| 8,091,778 B1 | 1/2012 | Block et al. |
| 8,093,988 B2 | 1/2012 | Takene et al. |
| 8,145,649 B2 | 3/2012 | Murdock et al. |
| 8,186,578 B1 | 5/2012 | Block et al. |
| 8,201,729 B1 | 6/2012 | Block et al. |
| 8,229,787 B2 | 7/2012 | Ramchandani et al. |
| 8,232,860 B2 | 7/2012 | Goel |
| 8,254,414 B2 | 8/2012 | Sakoda |
| 8,259,692 B2 | 9/2012 | Bajko |
| 8,260,707 B2 | 9/2012 | Treadwell et al. |
| 8,295,898 B2 | 10/2012 | Ashfield et al. |
| 8,332,232 B2 | 12/2012 | Nickerson et al. |
| 8,350,700 B2 | 1/2013 | Fast et al. |
| 8,369,266 B2 | 2/2013 | Jin et al. |
| 8,401,897 B1 | 3/2013 | Chatterjee |
| 8,413,209 B2 | 4/2013 | Aldera et al. |
| 8,413,891 B2 | 4/2013 | Long |
| 8,467,768 B2 | 6/2013 | Mahaffey et al. |
| 8,527,575 B2 | 9/2013 | Xiao et al. |
| 8,543,828 B2 | 9/2013 | Albisu |
| 8,558,759 B1 | 10/2013 | Prada Gomez et al. |
| 8,583,933 B2 | 11/2013 | Granbery |
| 8,590,028 B2 | 11/2013 | Saxena et al. |
| 8,606,712 B2 | 12/2013 | Choudhuri et al. |
| 8,627,422 B2 | 1/2014 | Hawkes et al. |
| 8,640,946 B1 | 2/2014 | Block et al. |
| 8,666,821 B2 | 3/2014 | Xie et al. |
| 8,666,895 B2 | 3/2014 | Grigg et al. |
| 8,671,001 B1 | 3/2014 | Thompson et al. |
| 8,742,894 B2 | 6/2014 | Seydoux |
| 9,166,967 B2 | 10/2015 | Berkovitz et al. |
| 9,204,251 B1 | 12/2015 | Mendelson |
| 9,204,257 B1 | 12/2015 | Mendelson |
| 9,264,151 B1 | 2/2016 | Emigh et al. |
| 9,265,450 B1 | 2/2016 | Giobbi |
| 9,317,672 B2 | 4/2016 | Carlson |
| 9,365,393 B2 | 6/2016 | Salmikuukka et al. |
| 9,367,978 B2 | 6/2016 | Sullivan |
| 9,380,417 B1 | 6/2016 | Boyle et al. |
| 9,454,736 B2 | 9/2016 | Reuveni et al. |
| 9,538,332 B1 | 1/2017 | Mendelson |
| 2002/0035541 A1 | 3/2002 | Makino et al. |
| 2002/0128850 A1 | 9/2002 | Chen et al. |
| 2003/0107649 A1 * | 6/2003 | Flickner ............. G06K 9/00362 348/150 |
| 2003/0125998 A1 * | 7/2003 | McKenney ............ G06Q 10/06 705/324 |
| 2003/0200140 A1 | 10/2003 | Hars |
| 2003/0200489 A1 | 10/2003 | Hars |
| 2004/0093265 A1 | 5/2004 | Ramchandani et al. |
| 2004/0093268 A1 | 5/2004 | Ramchandani et al. |
| 2004/0153368 A1 * | 8/2004 | Freishtat ............... G06Q 30/06 705/26.41 |
| 2006/0119469 A1 | 6/2006 | Hirai et al. |
| 2006/0163349 A1 | 7/2006 | Neugebauer |
| 2007/0042748 A1 | 2/2007 | MacArthur |
| 2007/0127693 A1 | 6/2007 | D'Ambrosio et al. |
| 2007/0186258 A1 | 8/2007 | Dapper et al. |
| 2007/0186261 A1 | 8/2007 | Geile et al. |
| 2007/0192815 A1 | 8/2007 | Geile et al. |
| 2007/0195689 A1 | 8/2007 | Dapper et al. |
| 2007/0195901 A1 | 8/2007 | Geile et al. |
| 2007/0195902 A1 | 8/2007 | Geile et al. |
| 2007/0201573 A1 | 8/2007 | Geile et al. |
| 2007/0206693 A1 | 9/2007 | Geile et al. |
| 2007/0253595 A1 | 11/2007 | Sorensen |
| 2007/0262134 A1 | 11/2007 | Humphrey et al. |
| 2007/0297589 A1 * | 12/2007 | Greischar ............. G06Q 10/00 379/201.01 |
| 2008/0046285 A1 * | 2/2008 | Greischar ............. G06Q 10/00 705/2 |
| 2008/0052151 A1 | 2/2008 | Xie et al. |
| 2008/0067244 A1 | 3/2008 | Marks |
| 2008/0097769 A1 | 4/2008 | Galvin et al. |
| 2008/0114697 A1 | 5/2008 | Black et al. |
| 2008/0150678 A1 | 6/2008 | Giobbi et al. |
| 2008/0249857 A1 * | 10/2008 | Angell ............... G06Q 30/0271 705/14.67 |
| 2008/0255929 A1 | 10/2008 | Mouton |
| 2008/0312998 A1 | 12/2008 | Templeton et al. |
| 2009/0037306 A1 | 2/2009 | Hill |
| 2009/0076875 A1 | 3/2009 | Lert, Jr. et al. |
| 2009/0241175 A1 | 9/2009 | Trandal et al. |
| 2009/0252318 A1 | 10/2009 | Smith et al. |
| 2009/0259499 A1 | 10/2009 | Bhojwani et al. |
| 2009/0325629 A1 | 12/2009 | Snyder |
| 2009/0328052 A1 | 12/2009 | Nguyen et al. |
| 2009/0328182 A1 | 12/2009 | Malakapalli et al. |
| 2010/0017874 A1 | 1/2010 | Piccinini et al. |
| 2010/0042541 A1 | 2/2010 | Kang et al. |
| 2010/0161433 A1 | 6/2010 | White |
| 2010/0191581 A1 | 7/2010 | Furin et al. |
| 2010/0198725 A1 | 8/2010 | Naccache |
| 2010/0205063 A1 | 8/2010 | Mersky |
| 2010/0277276 A1 | 11/2010 | Bayne et al. |
| 2010/0287250 A1 | 11/2010 | Carlson et al. |
| 2011/0028160 A1 | 2/2011 | Roeding et al. |
| 2011/0029359 A1 | 2/2011 | Roeding et al. |
| 2011/0029370 A1 | 2/2011 | Roeding et al. |
| 2011/0078279 A1 | 3/2011 | Grecco et al. |
| 2011/0086646 A1 | 4/2011 | Gupta et al. |
| 2011/0178862 A1 | 7/2011 | Daigle |
| 2011/0178863 A1 | 7/2011 | Daigle |
| 2011/0191242 A1 | 8/2011 | Allen |
| 2011/0202377 A1 | 8/2011 | Maiya et al. |
| 2011/0208657 A1 | 8/2011 | Rao |
| 2011/0213709 A1 | 9/2011 | Newman et al. |
| 2011/0223895 A1 | 9/2011 | Wagda et al. |
| 2011/0238499 A1 | 9/2011 | Blackhurst et al. |
| 2011/0246306 A1 | 10/2011 | Blackhurst et al. |
| 2011/0270618 A1 | 11/2011 | Banerjee et al. |
| 2011/0313804 A1 | 12/2011 | Camp et al. |
| 2011/0321031 A1 | 12/2011 | Dournov et al. |
| 2012/0004769 A1 | 1/2012 | Hallenbeck et al. |
| 2012/0047072 A1 | 2/2012 | Larkin |
| 2012/0070041 A1 | 3/2012 | Wang |
| 2012/0076183 A1 | 3/2012 | Dapper et al. |
| 2012/0078673 A1 | 3/2012 | Koke et al. |

(56) References Cited

U.S. PATENT DOCUMENTS

| | | |
|---|---|---|
| 2012/0078741 A1 | 3/2012 | DeLine |
| 2012/0116929 A1 | 5/2012 | Gventer et al. |
| 2012/0130840 A1 | 5/2012 | Carlier et al. |
| 2012/0136479 A1 | 5/2012 | Signorelli et al. |
| 2012/0143755 A1 | 6/2012 | Burrell |
| 2012/0158297 A1 | 6/2012 | Kim et al. |
| 2012/0185400 A1 | 7/2012 | Eubanks, Jr. et al. |
| 2012/0195184 A1 | 8/2012 | Dapper et al. |
| 2012/0197773 A1 | 8/2012 | Grigg et al. |
| 2012/0197797 A1 | 8/2012 | Grigg et al. |
| 2012/0197798 A1 | 8/2012 | Grigg et al. |
| 2012/0203892 A1 | 8/2012 | Pignataro et al. |
| 2012/0265622 A1* | 10/2012 | Ramchandani ........ G06Q 30/02 705/15 |
| 2012/0271692 A1 | 10/2012 | Huang et al. |
| 2012/0278115 A1 | 11/2012 | Acharya et al. |
| 2012/0278234 A1 | 11/2012 | Dent et al. |
| 2012/0320199 A1 | 12/2012 | Kundu et al. |
| 2012/0320214 A1 | 12/2012 | Kundu et al. |
| 2012/0321146 A1 | 12/2012 | Kundu et al. |
| 2012/0323642 A1 | 12/2012 | Camp et al. |
| 2013/0005253 A1 | 1/2013 | Grigg et al. |
| 2013/0005443 A1 | 1/2013 | Kosta et al. |
| 2013/0024300 A1 | 1/2013 | Choudhuri et al. |
| 2013/0027561 A1 | 1/2013 | Lee et al. |
| 2013/0030915 A1 | 1/2013 | Statler et al. |
| 2013/0041797 A1 | 2/2013 | Geeslin et al. |
| 2013/0045758 A1 | 2/2013 | Khorashadi et al. |
| 2013/0048724 A1 | 2/2013 | Burnside et al. |
| 2013/0104214 A1 | 4/2013 | Beck et al. |
| 2013/0121131 A1 | 5/2013 | Dapper et al. |
| 2013/0138497 A1 | 5/2013 | Yan et al. |
| 2013/0150006 A1 | 6/2013 | Nunally et al. |
| 2013/0159195 A1 | 6/2013 | Kirillin et al. |
| 2013/0165154 A1 | 6/2013 | Joshi |
| 2013/0173315 A1 | 7/2013 | Dorsey |
| 2013/0173387 A1 | 7/2013 | Adelaar |
| 2013/0173404 A1 | 7/2013 | Scipioni |
| 2013/0173492 A1 | 7/2013 | Leavenworth et al. |
| 2013/0182114 A1 | 7/2013 | Zhang et al. |
| 2013/0182904 A1 | 7/2013 | Zhang et al. |
| 2013/0198039 A1 | 8/2013 | Sridharan et al. |
| 2013/0203383 A1 | 8/2013 | Stopel et al. |
| 2013/0203439 A1 | 8/2013 | Lifshitz et al. |
| 2013/0211718 A1 | 8/2013 | Yoo et al. |
| 2013/0217416 A1 | 8/2013 | Matthews, III et al. |
| 2013/0238497 A1 | 9/2013 | Ramachandran et al. |
| 2013/0246301 A1 | 9/2013 | Radhakrishnan et al. |
| 2013/0253818 A1 | 9/2013 | Sanders et al. |
| 2013/0261964 A1 | 10/2013 | Goldman et al. |
| 2013/0268378 A1 | 10/2013 | Yovin |
| 2013/0275163 A1 | 10/2013 | Kaiser |
| 2013/0281084 A1 | 10/2013 | Batada et al. |
| 2013/0282589 A1 | 10/2013 | Shoup et al. |
| 2013/0282744 A1 | 10/2013 | Hartman et al. |
| 2013/0297422 A1 | 11/2013 | Hunter et al. |
| 2013/0300541 A1 | 11/2013 | Pesonen et al. |
| 2013/0310081 A1 | 11/2013 | Chu |
| 2013/0317778 A1 | 11/2013 | Gupta et al. |
| 2013/0325587 A1 | 12/2013 | Kothari et al. |
| 2013/0328725 A1 | 12/2013 | Wuoti et al. |
| 2013/0332271 A1 | 12/2013 | Hay |
| 2013/0332273 A1 | 12/2013 | Gu et al. |
| 2013/0346189 A1 | 12/2013 | Isaacs |
| 2014/0006219 A1 | 1/2014 | Wouhaybi et al. |
| 2014/0020073 A1 | 1/2014 | Ronda et al. |
| 2014/0032297 A1 | 1/2014 | Germann et al. |
| 2014/0032345 A1 | 1/2014 | Moore |
| 2014/0039950 A1 | 2/2014 | Appel et al. |
| 2014/0039951 A1 | 2/2014 | Appel et al. |
| 2014/0046718 A1 | 2/2014 | Schiller |
| 2014/0046830 A1 | 2/2014 | Orozco et al. |
| 2014/0052645 A1 | 2/2014 | Hawes et al. |
| 2014/0058914 A1 | 2/2014 | Song et al. |
| 2014/0068785 A1 | 3/2014 | Gventer et al. |
| 2014/0074800 A1 | 3/2014 | Gventer et al. |
| 2014/0081858 A1 | 3/2014 | Block et al. |
| 2014/0105263 A1 | 4/2014 | Geile |
| 2014/0110481 A1 | 4/2014 | Burnside et al. |
| 2014/0114877 A1 | 4/2014 | Montano |
| 2014/0129441 A1 | 5/2014 | Blanco et al. |
| 2014/0149293 A1 | 5/2014 | Laracey |
| 2014/0162598 A1 | 6/2014 | Villa-Real |
| 2014/0188733 A1 | 7/2014 | Granbery |
| 2014/0201025 A1 | 7/2014 | Adoni et al. |
| 2014/0222603 A1 | 8/2014 | Hay |
| 2014/0258028 A1 | 9/2014 | Bynum et al. |
| 2014/0270108 A1 | 9/2014 | Riahi et al. |
| 2014/0270109 A1 | 9/2014 | Riahi et al. |
| 2014/0270146 A1 | 9/2014 | Riahi et al. |
| 2014/0279009 A1 | 9/2014 | Grigg et al. |
| 2014/0279450 A1 | 9/2014 | Gujral |
| 2014/0280316 A1 | 9/2014 | Ganick et al. |
| 2014/0289032 A1 | 9/2014 | Muto et al. |
| 2014/0297527 A1 | 10/2014 | McLaughlin et al. |
| 2014/0309770 A1 | 10/2014 | Signorelli et al. |
| 2014/0365255 A1 | 12/2014 | Burgess et al. |
| 2014/0365334 A1 | 12/2014 | Hurewitz |
| 2015/0006213 A1* | 1/2015 | Heier ............. G06Q 10/063116 705/7.16 |
| 2015/0018011 A1 | 1/2015 | Mendelson |
| 2015/0051976 A1 | 2/2015 | Brown et al. |
| 2015/0058159 A1 | 2/2015 | Balram et al. |
| 2015/0059002 A1 | 2/2015 | Balram et al. |
| 2015/0072618 A1 | 3/2015 | Granbery |
| 2015/0073980 A1 | 3/2015 | Griffin et al. |
| 2015/0081492 A1 | 3/2015 | Brereton et al. |
| 2015/0089585 A1 | 3/2015 | Novack |
| 2015/0126119 A1 | 5/2015 | Schulz et al. |
| 2015/0140982 A1 | 5/2015 | Postrel |
| 2015/0235161 A1 | 8/2015 | Azar et al. |
| 2015/0278829 A1 | 10/2015 | Lu et al. |
| 2015/0278888 A1 | 10/2015 | Lu et al. |
| 2015/0287014 A1 | 10/2015 | Granbery |
| 2015/0289111 A1 | 10/2015 | Ozkan |
| 2015/0302469 A1 | 10/2015 | Billou |
| 2015/0382137 A1 | 12/2015 | Prehn et al. |
| 2016/0007157 A1 | 1/2016 | Tipton et al. |
| 2016/0277560 A1 | 9/2016 | Gruberman et al. |
| 2016/0335686 A1 | 11/2016 | AthuluruTlrumala et al. |
| 2017/0039616 A1 | 2/2017 | Korra et al. |

OTHER PUBLICATIONS

Swedberg, Claire, "Yes Bank Uses RFID to Personalize Service", Oct. 13, 2008, RFID Journal, <http://www.rfidjournal.com/articles/view?4381 >, 2 pages.

"Qmatic Orchestra," product summary retrieved from <http://www.stech.com.pk/product/qmatic-orchestral>, 10 pages.

Qmatic Valuing Time Catalog (Products and Systems for Customer Flow Management, unknown date) Obtained via <http://training.us.qmatic.com/pluginfile.php/385/mod_resource/content/8/Qmatic%20Product%20Catalog.pdf>, 26 pages.

Husmark, "4 Ways iBeacons Can Revolutionize Customer Service and Experience," obtained via <http://lp.gmatic.com/blog/4-ways-ibeacons-can-revolut>, 5 pages.

Marous, Jim, "10 Ways iBeacon Can Improve Banking Sales & Service", Mar. 31, 2014, The Financial Brand, retrieved from https://thefinancialbrand.com/38160/ibeacon-bank-branch-mobile-cross-selling/, 4 pages.

Berry, John, "How to Create an In-Branch Mobile Experience", Feb. 7, 2014, American Banker, retrieved from https://www.americanbanker.com/opinion/how-to-create-an-in-branch-mobile-experience, 3 pages.

Howden, Ben, "How banks can innovate using Apple's iBeacon", Feb. 23, 2014, Lighthouse.io Blog, retrieved from http://blog.lighthouse.io/banks-can-innovate-using-apples-ibeacon/, 3 pages.

Bender, Adam, "St. George Bank pings branch customers with iBeacon", May 13, 2014, Computerworld, retrieved from https://www.computerworld.com.au/article/621055/acma-mulls-5g-future-3-6ghz-spectrum, 2 pages.

(56) References Cited

OTHER PUBLICATIONS

Foo, Fran, "St. George getting to know your iface," May 13, 2014, The Australian, retrieved from http://www.theaustralian.com.au/business/technology/st-george-getting-to-know-your-iface/news-story/eab43c5797329c4fb70a94418416eeca, 3 pages.

Cisco, "iBeacon—Frequently Asked Questions", Mar. 24, 2014, Cisco Public (Year: 2014).

Charlton, Graham, "Five Examples of How Marketers Are Using iBeacons", Apr. 7, 2014, Econsultancy (Year: 2014).

Newman, Nic, "Apple iBeacon Technology Briefing", Jan. 17, 2014, MacMillan Publishers Ltd., Journal of Direct, Data and Marketing Practice (2014) 15, 222-225. doi:10.1057/dddmp.2014.7 (Year 2014).

DMI, "Beacon Technology: What's in It for Retailers", 2014, DMI Mobile Enterprise Solutions (Year: 2014).

Smith, Paul, "Google Glass and Apple's iBeacon on the Way to a Bank Near You", Feb. 4, 2014, Financial Review (Year: 2014).

Kar, Ian, "LevelUp Syncs With iBeacon to Connect with Customers Earlier", Jun. 14, 2014, Bank Innovation (Year 2014).

Silverman, Adam, "The Emergence of Beacons in Retail", Mar. 12, 2014, Forrester Research, Inc. (Year 2014).

"iBeacon: You Can Take It to the Bank", Mar. 1, 2014, Before It's News (Year 2014).

Clancy, Heather, "Apple's iBeacon Signals Turning Point for Mobile Engagement", Mar. 1, 2014, Fortune (Year 2014).

Crosman, Penny, "Q&A with Westpac's Digital Chief on Wearable Computing, iBeacon", Feb. 19, 2014, American Banker (Year: 2014).

Apple, Inc., "Getting Started with iBeacon" Verson 1.0, Jun. 2, 2014, Apple, Inc. (Year: 2014).

Statement RE: Related Applications dated Jul. 10, 2015.

Zibreg, Christian, "Apple Releases iBeacon Specification", Feb. 25, 2014, iDB, idownloadblog.com.

Quora, "What do you think are the biggest problems of iBeacons?", <https://www.quora.com/What-do-you-think-are-the-biggest-problems-of-iBeacons>, Jun. 23, 2016.

Sep. 5, 2018—U.S. Non-Final Office Action—U.S. Appl. No. 14/327,560.

Sep. 19, 2018—U.S. Non-Final Office Action—U.S. Appl. No. 14/327,565.

Jul. 9, 2018—U.S. Notice of Allowance—U.S. Appl. No. 14/328,147.

* cited by examiner

IDENTIFYING PERSONNEL-STAFFING ADJUSTMENTS BASED ON INDOOR POSITIONING SYSTEM DETECTION OF PHYSICAL CUSTOMER PRESENCE

BACKGROUND

Many organizations attempt to staff their customer service locations based on projected needs of their customers. Often, however, an organization's staffing is not optimally aligned with the needs of its customers. For example, an organization may fail to recognize that a subset of its customers having particular needs routinely visits a particular location on a particular day of the week, a particular time of the day, or the like, and may thus fail to allocate personnel that could address these needs to the particular location, on the particular day of the week, the particular time of the day, or the like. Accordingly, a need exists for identifying personnel-staffing adjustments based on indoor positioning system detection of physical customer presence.

SUMMARY

The following presents a simplified summary in order to provide a basic understanding of some aspects of the disclosure. This summary is not an extensive overview of the disclosure. It is intended neither to identify key or critical elements of the disclosure nor to delineate the scope of the disclosure. The following summary merely presents some concepts of the disclosure in a simplified form as a prelude to the description below.

In accordance with one or more embodiments, a computing platform may receive, over a period of time comprising a plurality of days, a plurality of messages comprising data indicating physical presence of a plurality of customers of a financial institution at a physical banking center location of the financial institution from an indoor positioning system located at the physical banking center location of the financial institution. The computing platform may identify one or more attributes of at least a portion of the plurality of customers of the financial institution at the physical banking center location of the financial institution. The computing platform may identify one or more adjustments to a personnel-staffing schedule for the physical banking center location of the financial institution based on at least a portion of the data indicating the physical presence of the plurality of customers of the financial institution at the physical banking center location of the financial institution and the one or more attributes of the at least a portion of the plurality of customers of the financial institution at the physical banking center location of the financial institution.

In some embodiments, the computing platform may generate a message indicating the one or more adjustments to the personnel-staffing schedule for the physical banking center location of the financial institution. In such embodiments, the computing platform may identify a computing device located at the physical banking center location of the financial institution, and may communicate the message indicating the one or more adjustments to the personnel-staffing schedule for the physical banking center location of the financial institution to the computing device located at the physical banking center location of the financial institution.

In some embodiments, at least one day subsequent to identifying the one or more adjustments to the personnel-staffing schedule for the physical banking center location of the financial institution, the computing platform may receive one or more messages comprising data indicating physical presence of one or more customers of the at least a portion of the plurality of customers of the financial institution at the physical banking center location of the financial institution from the indoor positioning system located at the physical banking center location of the financial institution. In such embodiments, responsive to receiving the one or more messages comprising the data indicating the physical presence of the one or more customers of the at least a portion of the plurality of customers of the financial institution at the physical banking center location of the financial institution, the computing platform may generate a message indicating the physical presence of the one or more customers of the at least a portion of the plurality of customers of the financial institution at the physical banking center location of the financial institution, identify at least one computing device located at the physical banking center location of the financial institution, and communicate the message indicating the physical presence of the one or more customers of the at least a portion of the plurality of customers of the financial institution at the physical banking center location of the financial institution to the at least one computing device located at the physical banking center location of the financial institution.

In some embodiments, identifying the at least one computing device located at the physical banking center location of the financial institution may including identifying one or more personal computing devices presently in possession of the one or more customers of the at least a portion of the plurality of customers of the financial institution at the physical banking center location of the financial institution based on at least one of the one or more messages comprising the data indicating physical presence of the one or more customers of the at least a portion of the plurality of customers of the financial institution at the physical banking center location of the financial institution. In such embodiments, communicating the message indicating the physical presence of the one or more customers of the at least a portion of the plurality of customers of the financial institution at the physical banking center location of the financial institution may include communicating the message indicating the physical presence of the one or more customers of the at least a portion of the plurality of customers of the financial institution at the physical banking center location of the financial institution to the one or more personal computing devices presently in possession of the one or more customers of the at least a portion of the plurality of customers of the financial institution at the physical banking center location of the financial institution.

In some embodiments, the computing platform may identify an associate of the financial institution who is located at the physical banking center location of the financial institution to assist the one or more customers of the at least a portion of the plurality of customers of the financial institution at the physical banking center location of the financial institution based at least in part on the one or more adjustments to the personnel-staffing schedule for the physical banking center location of the financial institution. In such embodiments, identifying the at least one computing device located at the physical banking center location of the financial institution may include identifying one or more personal computing devices presently in possession of the associate of the financial institution who is located at the physical banking center location of the financial institution, and communicating the message indicating the physical presence of the one or more customers of the at least a portion of the plurality of customers of the financial institution at the physical banking center location of the financial institution may include communicating the message indicating the physical presence of the one or more customers of the at least a portion of the plurality of customers of the financial institution at the physical banking center location of the financial institution to the one or more personal computing devices presently in possession of the associate of the financial institution who is located at the physical banking center location of the financial institution.

In some embodiments, the computing platform may receive one or more messages comprising data indicating physical presence of one or more associates of the financial institution at the physical banking center location of the financial institution from the indoor positioning system located at the physical banking center location of the financial institution. In such embodiments, identifying the one or more personal computing devices presently in possession of the associate of the financial institution who is located at the physical banking center location of the financial institution may include identifying the one or more personal computing devices presently in possession of the associate of the financial institution who is located at the physical banking center location of the financial institution based on at least one of the one or more messages comprising data indicating physical presence of one or more associates of the financial institution at the physical banking center location of the financial institution.

In some embodiments, responsive to receiving the plurality of messages comprising the data indicating the physical presence of the plurality of customers of the financial institution at the physical banking center location of the financial institution, the computing platform may generate a request for profile data for each of the plurality of customers of the financial institution at the physical banking center location of the financial institution. The computing platform may communicate the request for the profile data for each of the plurality of customers of the financial institution at the physical banking center location of the financial institution to a customer management system of the financial institution, and may receive customer profile data for each of the plurality of customers of the financial institution at the physical banking center location of the financial institution from the customer management system of the financial institution. In such embodiments, identifying the one or more attributes of the at least a portion of the plurality of customers of the financial institution at the physical banking center location of the financial institution may include identifying the one or more attributes of the at least a portion of the plurality of customers of the financial institution at the physical banking center location of the financial institution based on the customer profile data for each of the plurality of customers of the financial institution at the physical banking center location of the financial institution.

In some embodiments, the at least a portion of the plurality of customers of the financial institution at the physical banking center location of the financial institution may comprise high-wealth customers of the financial institution. In such embodiments, identifying the one or more attributes of the at least a portion of the plurality of customers of the financial institution at the physical banking center location of the financial institution may include identifying one or more attributes of the at least a portion of the plurality of customers of the financial institution at the physical banking center location of the financial institution indicating that the at least a portion of the plurality of customers of the financial institution at the physical banking center location of the financial institution comprise high-wealth customers of the financial institution, and identifying the one or more adjustments to the personnel-staffing schedule for the physical banking center location of the financial institution may include identifying an adjustment to the personnel-staffing schedule for the physical banking center location of the financial institution that schedules a wealth-management associate of the financial institution to be at the physical banking center location of the financial institution.

In some embodiments, the at least a portion of the plurality of customers of the financial institution at the physical banking center location of the financial institution may comprise customers of the financial institution that are nearing retirement age. In such embodiments, identifying the one or more attributes of the at least a portion of the plurality of customers of the financial institution at the physical banking center location of the financial institution may include identifying one or more attributes of the at least a portion of the plurality of customers of the financial institution at the physical banking center location of the financial institution indicating that the at least a portion of the plurality of customers of the financial institution at the physical banking center location of the financial institution are nearing retirement age, and identifying the one or more adjustments to the personnel-staffing schedule for the physical banking center location of the financial institution may include identifying an adjustment to the personnel-staffing schedule for the physical banking center location of the financial institution that schedules a retirement-planning associate of the financial institution to be at the physical banking center location of the financial institution.

In some embodiments, the at least a portion of the plurality of customers of the financial institution at the physical banking center location of the financial institution may comprise customers of the financial institution that could benefit from debt-management counseling. In such embodiments, identifying the one or more attributes of the at least a portion of the plurality of customers of the financial institution at the physical banking center location of the financial institution may include identifying one or more attributes of the at least a portion of the plurality of customers of the financial institution at the physical banking center location of the financial institution indicating that the at least a portion of the plurality of customers of the financial institution at the physical banking center location of the financial institution could benefit from debt-management counseling, and identifying the one or more adjustments to the personnel-staffing schedule for the physical banking center location of the financial institution may include identifying an adjustment to the personnel-staffing schedule for the physical banking center location of the financial institution that schedules a debt-management associate of the financial institution to be at the physical banking center location of the financial institution.

In some embodiments, the computing platform may determine a plurality of dates and times based on the plurality of messages comprising the data indicating the physical presence of the plurality of customers of the financial institution at the physical banking center location of the financial institution. Each date and time of the plurality of dates and times may correspond to physical presence of a customer of the plurality of customers of the financial institution at the physical banking center location of the financial institution. The computing platform may identify a set of dates and times corresponding to physical presence of the at least a portion of the plurality of customers of the financial institution at the physical banking center location of the financial institution from amongst the plurality of dates and times. In such embodiments, identifying the one or more adjustments to the personnel-staffing schedule for the physical banking center location of the financial institution may include identifying one or more adjustments to the personnel-staffing schedule for the physical banking center location of the financial institution that adjust the personnel-staffing schedule for the physical banking center location of the financial institution for at least one date or time corresponding to a date or time from amongst the set of dates and times corresponding to physical presence of the at least a portion of the plurality of customers of the financial institution at the physical banking center location of the financial institution based on the set of dates and times corresponding to physical presence of the at least a portion of the plurality of customers of the financial institution at the physical banking center location of the financial institution.

In some embodiments, the indoor positioning system may include a plurality of personal computing devices presently in possession of the customers of the financial institution at the physical banking center location of the financial institution, and at least one location beacon that is located at the physical banking center location of the financial institution and configured to emit a signal comprising an identifier associated with the physical banking center location. In such embodiments, receiving the plurality of messages comprising data indicating the physical presence of the customers of the financial institution at the physical banking center location of the financial institution may include receiving data comprising the identifier associated with the physical banking center location from the plurality of personal computing devices.

In some embodiments, the indoor positioning system may include a location beacon that is located at a first location of the physical banking center location of the financial institution and configured to emit a signal comprising an identifier associated with the first location of the physical banking center location of the financial institution, and a location beacon that is located at a second location of the physical banking center location of the financial institution and configured to emit a signal comprising an identifier associated with the second location of the physical banking center location of the financial institution. In such embodiments, receiving the plurality of messages comprising data indicating physical presence of the customers of the financial institution at the physical banking center location of the financial institution may include receiving messages comprising data indicating physical presence of a portion of the customers of the financial institution at the first location of the physical banking center location of the financial institution, and receiving messages comprising data indicating physical presence of a portion of the customers of the financial institution at the second location of the physical banking center location of the financial institution.

In some embodiments, identifying the one or more attributes of the at least a portion of the plurality of customers of the financial institution at the physical banking center location of the financial institution may include identifying one or more attributes of the portion of the customers of the financial institution at the first location of the physical banking center location of the financial institution, and one or more attributes of the portion of the customers of the financial institution at the second location of the physical banking center location of the financial institution. In such embodiments, identifying the one or more adjustments to the personnel-staffing schedule for the physical banking center location of the financial institution may include identifying one or more adjustments to a personnel-staffing schedule for the first location of the physical banking center location of the financial institution, and one or more adjustments to a personnel-staffing schedule for the second location of the physical banking center location of the financial institution.

Other details and features will be described in the sections that follow.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements, and wherein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
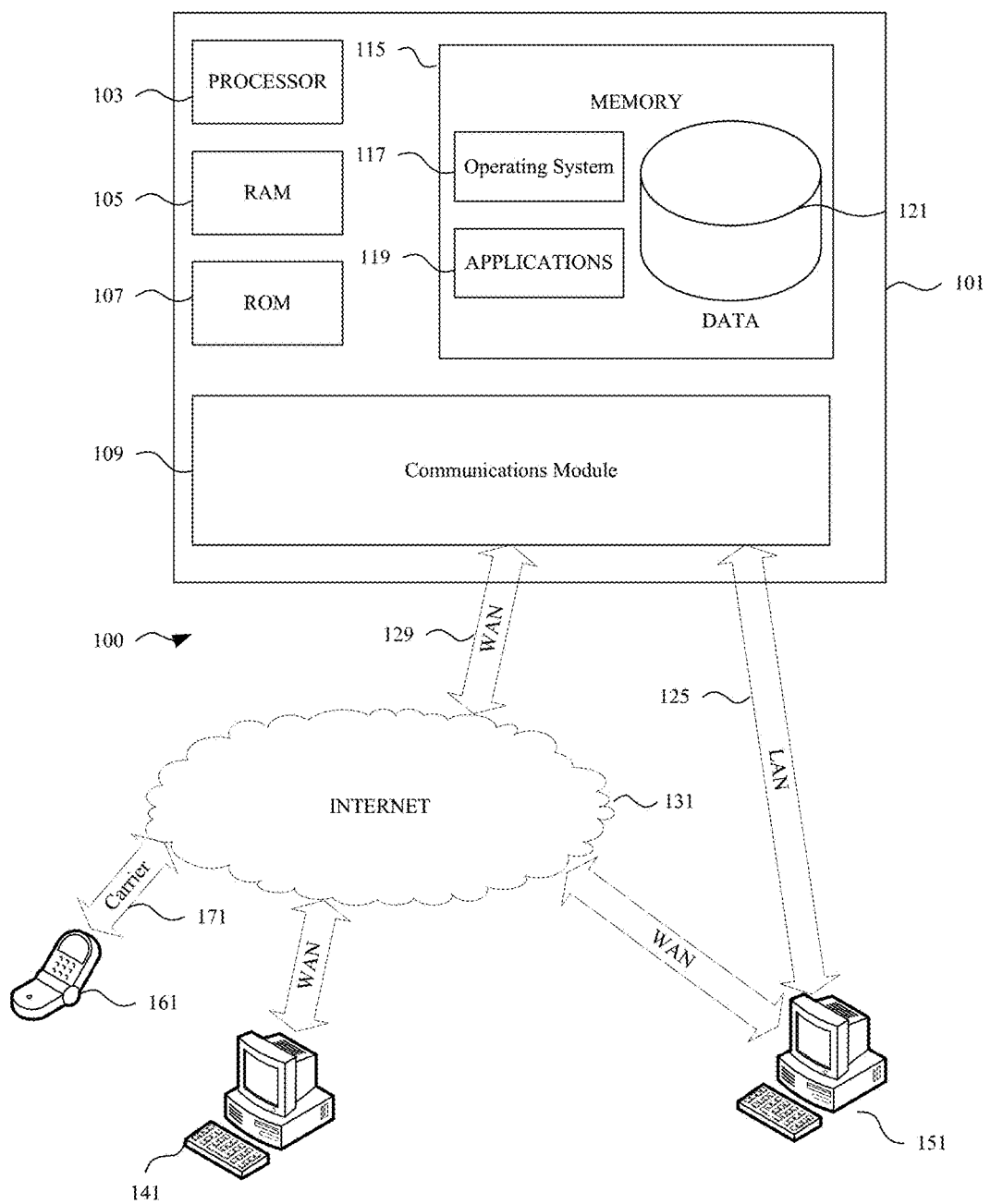
FIG. 1 depicts an illustrative operating environment in which various aspects of the present disclosure may be implemented in accordance with one or more example embodiments.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks), are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
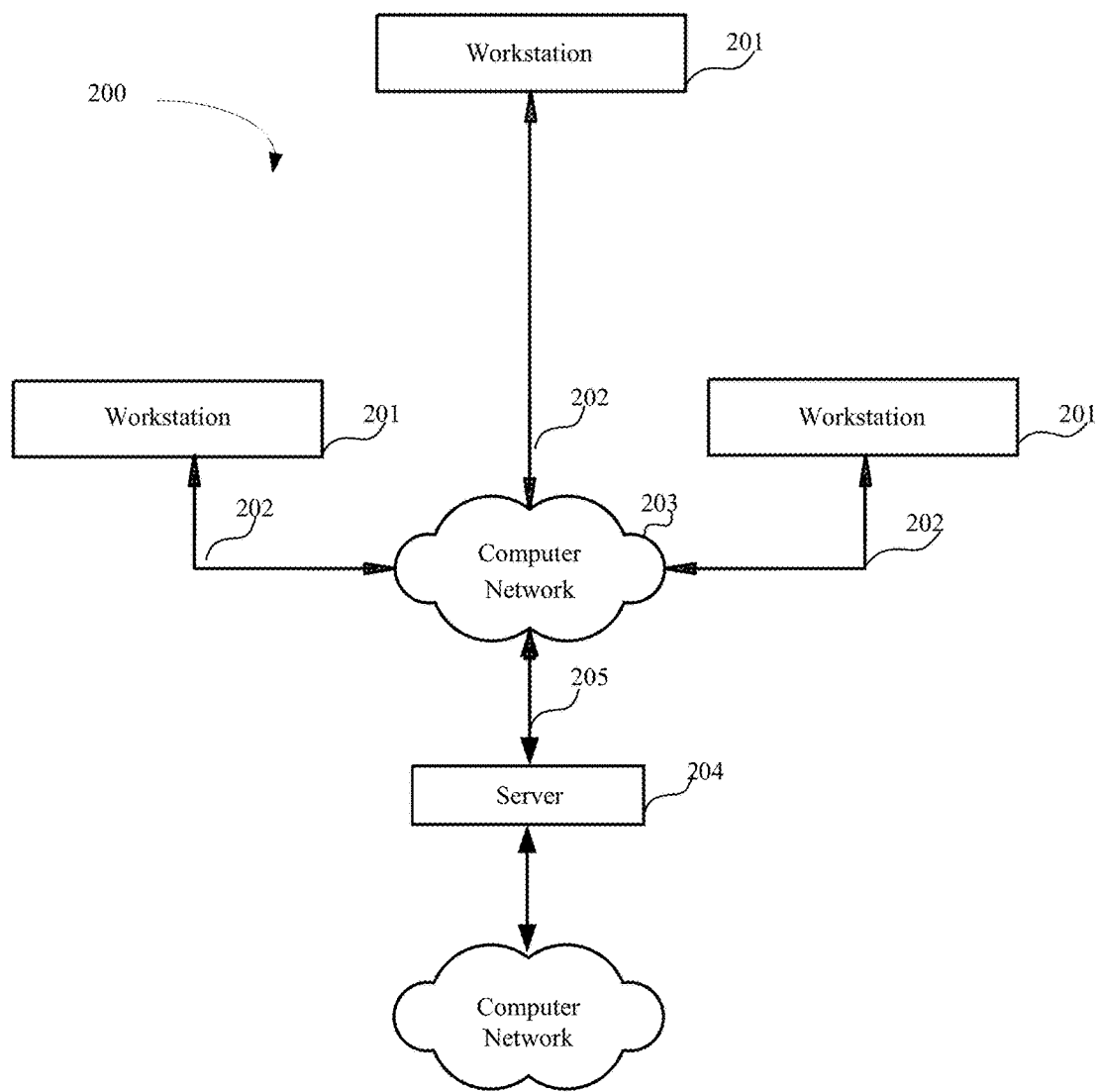
FIG. 2 depicts an illustrative block diagram of workstations and servers that may be used to implement the processes and functions of certain aspects of the present disclosure in accordance with one or more example embodiments.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Figure 3:
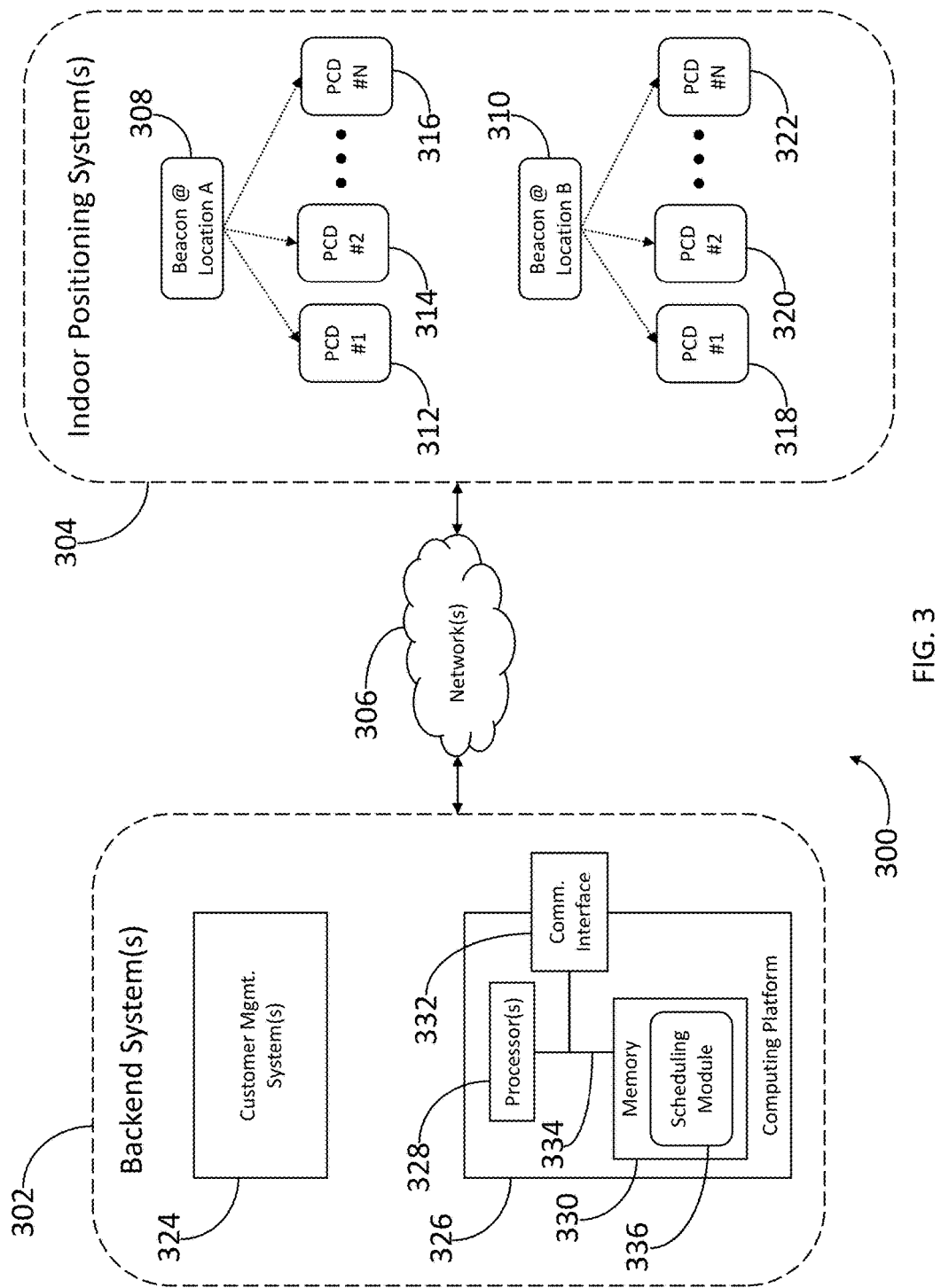
FIG. 3 depicts an illustrative computing environment for identifying personnel-staffing adjustments based on indoor positioning system detection of physical customer presence in accordance with one or more example embodiments.

FIG. 3 depicts an illustrative computing environment for identifying personnel-staffing adjustments based on indoor positioning system detection of physical customer presence in accordance with one or more example embodiments. Referring to FIG. 3, computing environment 300 may include one or more computing systems. For example, computing environment 300 may include backend computing system(s) 302 and indoor positioning system(s) 304. As will be described in greater detail below, backend computing system(s) 302 and/or indoor positioning system(s) 304 may include one or more computing devices associated with an organization (e.g., a financial institution). Indoor positioning system(s) 304 may be located at a particular physical location associated with the organization (e.g., a physical banking center location of the financial institution). In some embodiments, backend computing system(s) 302 may be located at a different geographic location from indoor positioning system(s) 304 (e.g., a central processing facility associated with the financial institution). Computing environment 300 may also include one or more networks. For example, computing environment 300 may include network(s) 306. Network(s) 306 may interconnect one or more computing devices of backend computing system(s) 302, and/or one or more computing devices of indoor positioning system(s) 304, and may include one or more sub-networks (e.g., LANs, WANs, or the like).

Indoor positioning system(s) 304 may include one or more location beacons configured to emit or broadcast a signal (e.g., a Bluetooth Low Energy signal, a Bluetooth Smart signal, a low-power radio signal, or the like) comprising an identifier associated with its physical location (e.g., a physical banking center location of the financial institution and/or a location within the physical banking center location of the financial institution). For example, indoor positioning system(s) 304 may include location beacon 308 and location beacon 310. Location beacon 308 may be configured to emit a signal comprising an identifier associated with its physical location (e.g., Location "A"), for example, an identifier associated with the physical banking center location of the financial institution and/or a location within the physical banking center location of the financial institution (e.g., an area associated with one or more human tellers, an area associated with one or more automated teller machines, an area associated with one or more loan officers, an area associated with one or more financial planners, an area associated with one or more customer service professionals, an area associated with an indoor lobby, an area associated with an outdoor lobby, an area associated with a walk-up or drive-up window, or the like). Similarly, location beacon 310 may be configured to emit a signal comprising an identifier associated with its physical location (e.g., Location "B"), for example, an identifier associated with the physical banking center location of the financial institution and/or a different location within the physical banking center location of the financial institution. Indoor positioning system(s) 304 may also include one or more personal computing devices, which may be presently in the possession of individuals (e.g., customers and/or associates of the financial institution) located at indoor positioning system(s) 304's physical location. For example, indoor positioning system(s) 304 may include personal computing devices 312 and 314 through 316, and personal computing devices 318 and 320 through 322.

Personal computing devices 312 and 314 through 316, and/or personal computing devices 318 and 320 through 322 may be any type of computing device capable of detecting the signal(s) emitted or broadcast by location beacon 308 and/or location beacon 310, generating a messaging indicating detection of the signal(s), and communicating the message indicating detection of the signal(s) to one or more other computing devices. For example, personal computing devices 312 and 314 through 316, and/or personal computing devices 318 and 320 through 322 may include one or more laptop computers, tablet computers, smart phones, mobile devices, near field communication tags, or the like. As will be described in greater detail below, when located within a proximity (e.g., zero to one hundred meters) of location beacon 308 and/or location beacon 310, personal computing devices 312 and 314 through 316, and/or personal computing devices 318 and 320 through 322 may be configured to detect signal(s) emitted by location beacon 308 and/or location beacon 310. Responsive to detecting signal(s) emitted by location beacon 308 and/or location beacon 310, personal computing devices 312 and 314 through 316, and/or personal computing devices 318 and 320 through 322 may be configured to generate a message indicating detection of the signal(s), and communicate the message to one or more other computing devices (e.g., one or more computing devices of backend computing system(s) 302). As indicated above, the signal(s) emitted by location beacon 308 and/or location beacon 310 may comprise one or more identifiers associated with their respective locations (e.g., Location "A," Location "B," or the like), and the message(s) generated by personal computing devices 312 and 314 through 316, and/or personal computing devices 318 and 320 through 322 responsive to detection of the signal(s) may comprise the identifier(s) and/or information identified utilizing the identifier(s) (e.g., information associated with Location "A," Location "B," or the like). Additionally or alternatively, the message(s) generated by personal computing devices 312 and 314 through 316, and/or personal computing devices 318 and 320 through 322 responsive to detection of the signal(s) may comprise identifiers associated with an individual presently in possession of one or more of personal computing devices 312 and 314 through 316, and/or personal computing devices 318 and 320 through 322, for example, customer identifier(s), associate identifier(s), or the like.

Backend computing system(s) 302 may include one or more computing devices associated with the organization (e.g., the financial institution). For example, backend computing system(s) 302 may include customer management system(s) 324 and computing platform 326. As will be described in greater detail below, customer management system(s) 324 may include one or more computing devices (e.g., mainframes, servers, server blades, or the like) configured to maintain information regarding customers of the organization (e.g., profile data for customers of the financial institution). Computing platform 326 may include one or more processor(s) 328, memory 330, communication interface 332, and data bus 334. Data bus 334 may interconnect processor(s) 328, memory 330, and/or communication interface 332. Communication interface 332 may be a network interface configured to support communications between computing platform 326 and network(s) 306, or one or more sub-networks thereof. Memory 330 may include one or more program modules comprising instructions that when executed by processor(s) 328 cause computing platform 326 to perform one or more functions described herein. For example, memory 330 may include scheduling module 336, which may comprise instructions that when executed by processor(s) 328 may cause computing platform 326 to perform one or more functions described herein.

Figure 4A:
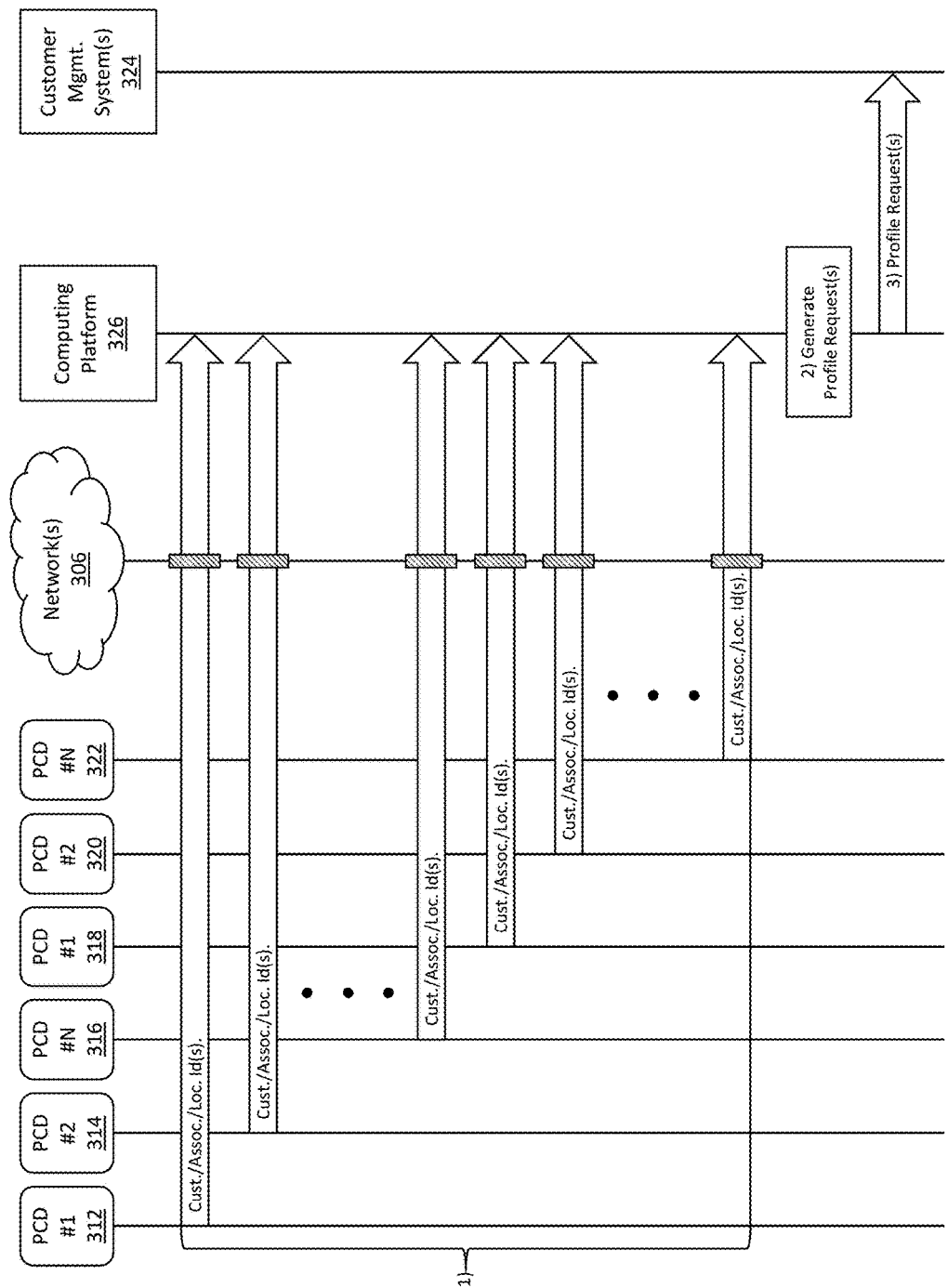
FIGS. 4A, 4B, 4C, and 4D depict an illustrative event sequence for identifying personnel-staffing adjustments based on indoor positioning system detection of physical customer presence in accordance with one or more example embodiments.

FIGS. 4A, 4B, 4C, and 4D depict an illustrative event sequence for identifying personnel-staffing adjustments based on indoor positioning system detection of physical customer presence in accordance with one or more example embodiments. Referring to FIG. 4A, at step 1, computing platform 326 may receive (e.g., via communication interface 332 and network(s) 306), over a period of time comprising multiple days, a plurality of messages comprising data indicating physical presence of individuals associated with an organization (e.g., customers and/or associates of a financial institution) at a physical location of the organization from indoor positioning system(s) 304 (e.g., an indoor positioning system located at a physical banking center location of the financial institution). For example, individuals (e.g., customers and/or associates of the financial institution) presently in possession of personal computing devices 312 and 314 through 316 may be located, during at least a portion of the period of time, within a predetermined proximity of location beacon 308 (e.g., at Location "A"), and personal computing devices 312 and 314 through 316 may detect a signal emitted by location beacon 308 comprising an identifier associated with its location, and, responsive to detecting the signal, may generate and communicate to computing platform 326 (e.g., via network(s) 306) one or more messages indicating their physical presence within the proximity of location beacon 308. Similarly, individuals (e.g., customers and/or associates of the financial institution) presently in possession of personal computing devices 318 and 320 through 322 may be located, during at least a portion of the period of time, within a predetermined proximity of location beacon 310 (e.g., at Location "B"), and personal computing devices 318 and 320 through 322 may detect a signal emitted by location beacon 310 comprising an identifier associated with its location, and, responsive to detecting the signal, may generate and communicate to computing platform 326 (e.g., via network(s) 306) one or more messages indicating their physical presence within the proximity of location beacon 310.

In some embodiments, each of the plurality of messages may include an identifier associated with the location (e.g., the identifier contained in the signal emitted by location beacon 308 and/or location beacon 310, information identified utilizing the identifier(s), or the like) and/or one or more identifiers associated with an individual (e.g., an associate or customer of the financial institution) presently in possession of the personal computing device that generated the message. For example, a message received from personal computing device 312 may comprise an identifier associated with Location "A" and/or an identifier associated with an individual presently in possession of personal computing device 312 (e.g., at Location "A"). Similarly, a message received from personal computing device 314 may comprise an identifier associated with Location "A" and/or an identifier associated with an individual presently in possession of personal computing device 314 (e.g., at Location "A"); a message received from personal computing device 316 may comprise an identifier associated with Location "A" and/or an identifier associated with an individual presently in possession of personal computing device 316 (e.g., at Location "A"); a message received from personal computing device 318 may comprise an identifier associated with Location "B" and/or an identifier associated with an individual presently in possession of personal computing device 318 (e.g., at Location "B"); a message received from personal computing device 320 may comprise an identifier associated with Location "B" and/or an identifier associated with an individual presently in possession of personal computing device 320 (e.g., at Location "B"); and a message received from personal computing device 322 may comprise an identifier associated with Location "B" and/or an identifier associated with an individual presently in possession of personal computing device 322 (e.g., at Location "B").

Figure 4B:
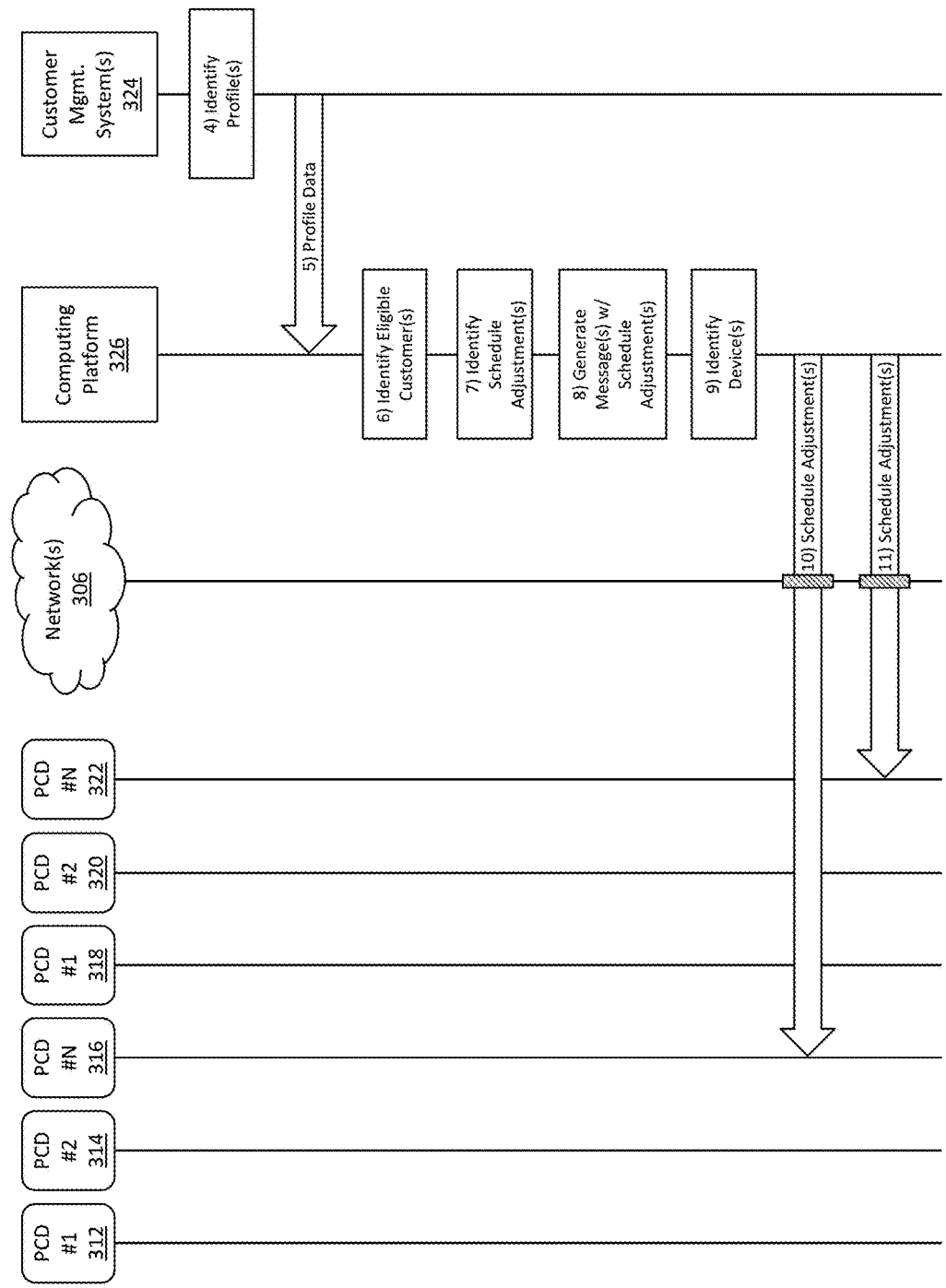

At step 2, computing platform 326 may generate a request for profile data for one or more customers identified by the messages received from indoor positioning system(s) 304. For example, as indicated above, one or more of the messages received from personal computing devices 312 and 314 through 316, and/or personal computing devices 318 and 320 through 322 may include identifiers associated with individuals presently in possession of one or more of personal computing devices 312 and 314 through 316, and/or personal computing devices 318 and 320 through 322, and computing platform 326 may utilize the identifier(s) to identify one or more customers present at the physical location(s) (e.g., Location "A" and/or Location "B") and may generate a request for profile data associated with the customer(s). At step 3, computing platform 326 may communicate (e.g., via communication interface 332) the request for profile data for the customer(s) to customer management system(s) 324. Referring to FIG. 4B, at step 4, responsive to the request for the profile data for the customer(s), one or more computing devices of customer management system(s) 324 may identify the profile data associated with the customer(s), and, at step 5, may communicate the profile data associated with the customer(s) to computing platform 326, which may receive the profile data (e.g., via communication interface 332).

At step 6, computing platform 326 may identify at least a portion of the customers present at the physical location(s) that are eligible for one or more additional assistance programs offered by the organization, for example, by identifying one or more shared attributes of the at least a portion of the customers. For example, computing platform 326 may identify one or more attributes shared by a customer associated with personal computing device 314 and a customer associated with personal computing device 320. In some embodiments, computing platform 326 may identify the shared attribute(s) based on customer profile data for the at least a portion of the customers. For example, computing platform 326 may identify the attribute(s) shared by the customer associated with personal computing device 314 and the customer associated with personal computing device 320 based on a portion of the customer profile data received from customer management system(s) 324 in step 5 above (e.g., a portion of the profile data associated with the customer associated with personal computing device 314 and/or the customer associated with personal computing device 320). In some embodiments, the at least a portion of the customers may comprise high-wealth customers, and computing platform 326 may identify one or more attributes of the at least a portion of the customers indicating that the at least a portion of the customers comprise high-wealth customers. Additionally or alternatively, the at least a portion of the customers may comprise customers that are nearing retirement age, and computing platform 326 may identify one or more attributes of the at least a portion of the customers indicating that the at least a portion of the customers are nearing retirement age, and/or the at least a portion of the customers may comprise customers that could benefit from debt-management counseling, and computing platform 326 may identify one or more attributes of the at least a portion of the customers indicating that the at least a portion of the customers could benefit from debt-management counseling.

At step 7, computing platform 326 may identify one or more adjustments to a personnel-staffing schedule for the physical location(s) associated with indoor positioning system(s) 304 based on at least a portion of the data indicating the physical presence of the customers at the physical location and/or the one or more identified attributes of the at least a portion of the customers. In some embodiments, computing platform 326 may determine a plurality of dates and times based on the messages comprising the data indicating the physical presence of the customers at the physical location(s) associated with indoor positioning system(s) 304 (e.g., the messages received in step 1 above). Each date and time of the plurality of dates and times may correspond to physical presence of a customer at the physical location(s) associated with indoor positioning system(s) 304. For example, computing platform 326 may determine a date and time when a customer associated with personal computing device 312 was present at Location "A" based on the message received from personal computing device 312 (e.g., in step 1 above). Similarly, computing platform 326 may determine a date and time when the customer associated with personal computing device 314 was present at Location "A" based on the message received from personal computing device 314 (e.g., in step 1 above); a date and time when a customer associated with personal computing device 318 was present at Location "B" based on the message received from personal computing device 318 (e.g., in step 1 above); and a date and time when the customer associated with personal computing device 320 was present at Location "B" based on the message received from personal computing device 320 (e.g., in step 1 above). Computing platform 326 may identify a set of dates and times corresponding to physical presence of the at least a portion of the customers (e.g., the customer associated with personal computing device 314 and the customer associated with personal computing device 320) from amongst the plurality of dates and times. In such embodiments, computing platform 326 may identify one or more adjustments to the personnel-staffing schedule for the physical location(s) associated with indoor positioning system(s) 304 that adjust the personnel-staffing schedule(s) for at least one date or time corresponding to a date or time from amongst the set of dates and times corresponding to physical presence of the at least a portion of the customers (e.g., date(s) and/or time(s) associated with the physical presence of the customer associated with personal computing device 314 at Location "A" and/or the customer associated with personal computing device 320 at Location "B"). For example, as indicated above, the identified portion of the customers that share the one or more identified attributes (e.g., the customer associated with personal computing device 314 and the customer associated with personal computing device 320) may comprise high-wealth customers, and computing platform 326 may identify one or more adjustments to a personnel-staffing schedule that schedule a wealth-management associate to be at the physical location(s) associated with indoor positioning system(s) 304 at dates and/or times that correspond to date(s) and/or time(s) when the at least a portion of the customers were previously physically present at the physical location(s). Additionally or alternatively, the identified portion of the customers that share the one or more identified attributes (e.g., the customer associated with personal computing device 314 and the customer associated with personal computing device 320) may comprise customers that are nearing retirement age, and computing platform 326 may identify one or more adjustments to a personnel-staffing schedule that schedule a retirement-planning associate to be at the physical location(s) associated with indoor positioning system(s) 304 at dates and/or times that correspond to date(s) and/or time(s) when the at least a portion of the customers were previously physically present at the physical location(s), and/or the identified portion of the customers that share the one or more identified attributes (e.g., the customer associated with personal computing device 314 and the customer associated with personal computing device 320) may comprise customers that could benefit from debt-management counseling, and computing platform 326 may identify one or more adjustments to a personnel-staffing schedule that schedule a debt-management associate to be at the physical location(s) associated with indoor positioning system(s) 304 at dates and/or times that correspond to date(s) and/or time(s) when the at least a portion of the customers were previously physically present at the physical location(s).

At step 8, computing platform 326 may generate one or more messages indicating the identified adjustment(s) to the personnel-staffing schedule(s) for the physical location(s) associated with indoor positioning system(s) 304. For example, computing platform 326 may generate a message indicating than an associate associated with personal computing device 316 should be physically present at Location "A" at a date and/or time (e.g., a future date and/or time) corresponding to the date and/or time when the customer associated with personal computing device 314 was previously physically present at Location "A" (e.g., to assist the customer associated with personal computing device 314 with the additional assistance program(s) identified based on the one or more attributes associated with the customer associated with personal computing device 314). Similarly, computing platform 326 may generate a message indicating than an associate associated with personal computing device 322 should be physically present at Location "B" at a date and/or time (e.g., a future date and/or time) corresponding to the date and/or time when the customer associated with personal computing device 320 was previously physically present at Location "B" (e.g., to assist the customer associated with personal computing device 320 with the additional assistance program(s) identified based on the one or more attributes associated with the customer associated with personal computing device 320).

At step 9, computing platform 326 may identify one or more computing devices located at the physical location(s) associated with indoor positioning system(s) 304. For example, computing platform 326 may identify personal computing device 316 (e.g., based on the message received from personal computing device 316 in step 1 above), and/or personal computing device 322 (e.g., based on the message received from personal computing device 322 in step 1 above). At step 10, computing platform 326 may communicate (e.g., via communication interface 332 and network(s) 306) the message indicating than the associate associat- ed with personal computing device 316 should be physically present at Location "A" at the date and/or time corresponding to the date and/or time when the customer associated with personal computing device 314 was previously physically present at Location "A" (e.g., to assist the customer associated with personal computing device 314 with the additional assistance program(s) identified based on the one or more attributes associated with the customer associated with personal computing device 314) to personal computing device 316. At step 11, computing platform 326 may communicate (e.g., via communication interface 332 and network(s) 306) the message indicating than the associate associated with personal computing device 322 should be physically present at Location "B" at the date and/or time corresponding to the date and/or time when the customer associated with personal computing device 320 was previously physically present at Location "B" (e.g., to assist the customer associated with personal computing device 320 with the additional assistance program(s) identified based on the one or more attributes associated with the customer associated with personal computing device 320) to personal computing device 322.

Figure 4C:
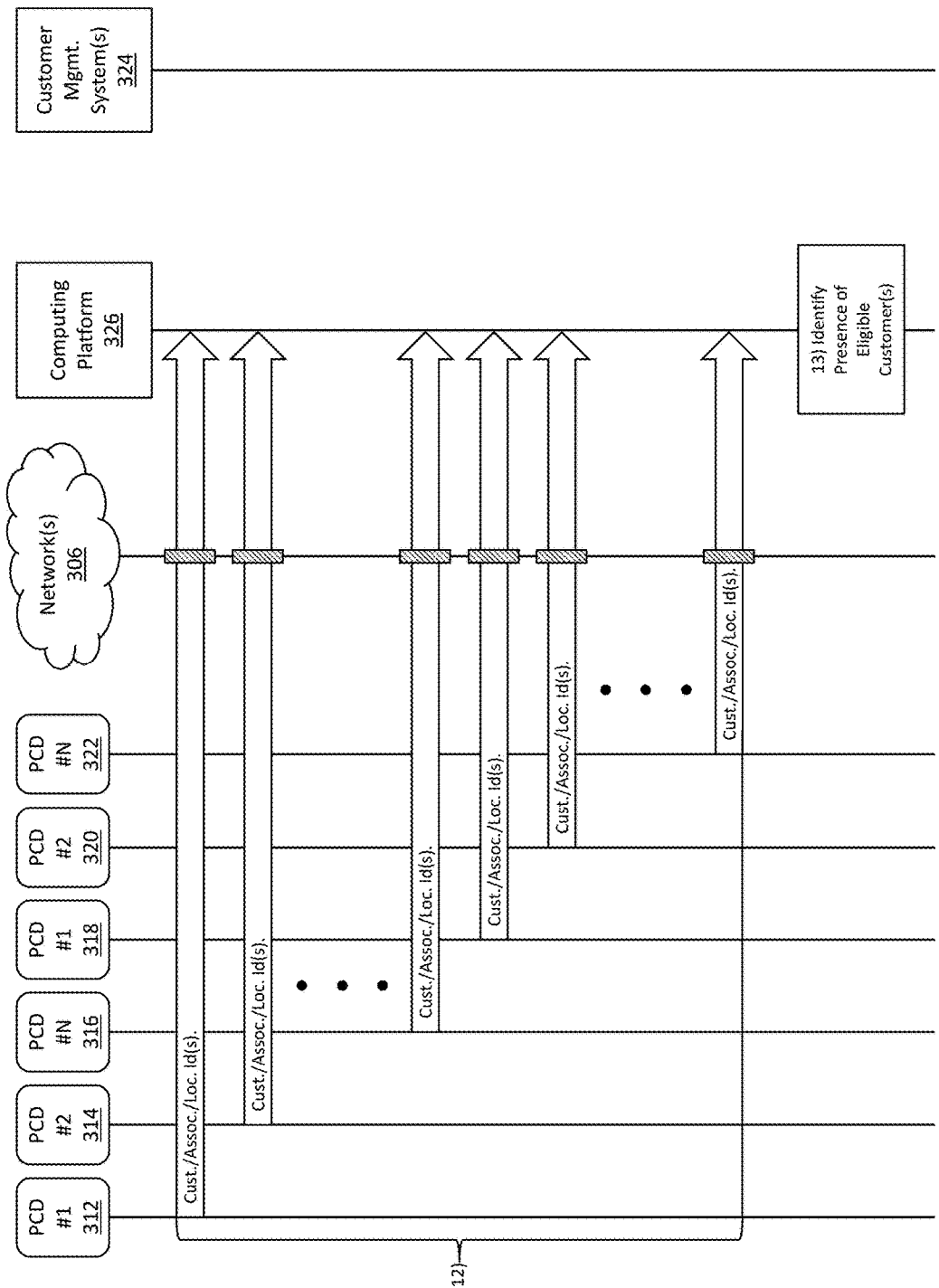

Referring to FIG. 4C, at step 12, computing platform 326 may receive (e.g., via communication interface 332 and network(s) 306), at a time at least one day subsequent to identifying the adjustment(s) to the personnel-staffing schedule(s) for the location(s) associated with indoor positioning system(s) 304, a plurality of messages comprising data indicating physical presence of individuals associated with the organization (e.g., customers and/or associates of the financial institution) at a physical location of the organization from indoor positioning system(s) 304 (e.g., an indoor positioning system located at the physical banking center location of the financial institution). For example, individuals (e.g., customers and/or associates of the financial institution) presently in possession of personal computing devices 312 and 314 through 316 may be located within a predetermined proximity of location beacon 308 (e.g., at Location "A"), and personal computing devices 312 and 314 through 316 may detect a signal emitted by location beacon 308 comprising an identifier associated with its location, and, responsive to detecting the signal, may generate and communicate to computing platform 326 (e.g., via network(s) 306) one or more messages indicating their physical presence within the proximity of location beacon 308. Similarly, individuals (e.g., customers and/or associates of the financial institution) presently in possession of personal computing devices 318 and 320 through 322 may be located within a predetermined proximity of location beacon 310 (e.g., at Location "B"), and personal computing devices 318 and 320 through 322 may detect a signal emitted by location beacon 310 comprising an identifier associated with its location, and, responsive to detecting the signal, may generate and communicate to computing platform 326 (e.g., via network(s) 306) one or more messages indicating their physical presence within the proximity of location beacon 310.

In some embodiments, each of the plurality of messages may include an identifier associated with the location (e.g., the identifier contained in the signal emitted by location beacon 308 and/or location beacon 310, information identified utilizing the identifier(s), or the like) and/or one or more identifiers associated with an individual (e.g., an associate or customer of the financial institution) presently in possession of the personal computing device that generated the message. For example, a message received from personal computing device 312 may comprise an identifier associated with Location "A" and/or an identifier associated with an individual presently in possession of personal computing device 312 (e.g., at Location "A"). Similarly, a message received from personal computing device 314 may comprise an identifier associated with Location "A" and/or an identifier associated with an individual presently in possession of personal computing device 314 (e.g., at Location "A"); a message received from personal computing device 316 may comprise an identifier associated with Location "A" and/or an identifier associated with an individual presently in possession of personal computing device 316 (e.g., at Location "A"); a message received from personal computing device 318 may comprise an identifier associated with Location "B" and/or an identifier associated with an individual presently in possession of personal computing device 318 (e.g., at Location "B"); a message received from personal computing device 320 may comprise an identifier associated with Location "B" and/or an identifier associated with an individual presently in possession of personal computing device 320 (e.g., at Location "B"); and a message received from personal computing device 322 may comprise an identifier associated with Location "B" and/or an identifier associated with an individual presently in possession of personal computing device 322 (e.g., at Location "B").

Figure 4D:
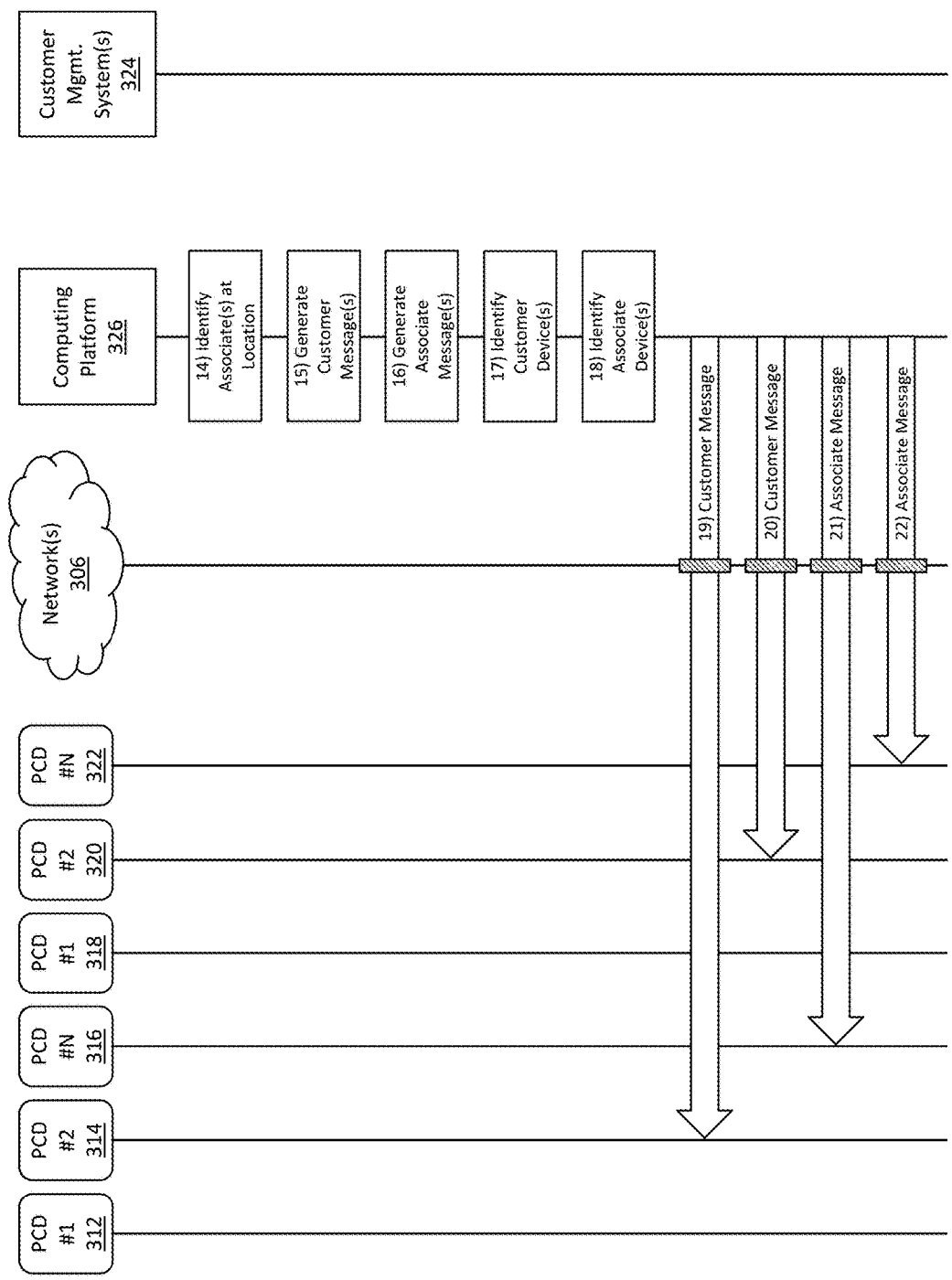

Responsive to receiving the messages comprising the data indicating the physical presence of the customers at the physical location(s) associated with indoor positioning system(s) 304 (e.g., the return of the customer associated with personal computing device 314 and/or the return of the customer associated with personal computing device 320), at step 13, computing platform 326 may identify the presence of customer(s) eligible for the additional assistance program(s) at the physical location(s) associated with indoor positioning system(s) 304 (e.g., the physical presence of the customer associated with personal computing device 314 at Location "A" and/or the physical presence of the customer associated with personal computing device 320 at Location "B"). Referring to FIG. 4D, responsive to identifying the presence of the customer(s) eligible for the additional assistance program(s) at the physical location(s) associated with indoor positioning system(s) 304, at step 14, computing platform 326 may identify one or more associates at the location(s) to assist the customer(s) eligible for the additional assistance program(s). For example, computing platform 326 may identify the associate associated with personal computing device 316 to assist the customer associated with personal computing device 314 (e.g., based on the previously identified adjustment(s) to the personnel-staffing schedule for Location "A" and/or the message received from personal computing device 316 in step 12 above). Similarly, computing platform 326 may identify the associate associated with personal computing device 322 to assist the customer associated with personal computing device 320 (e.g., based on the previously identified adjustment(s) to the personnel-staffing schedule for Location "B" and/or the message received from personal computing device 322 in step 12 above).

Figure 5:
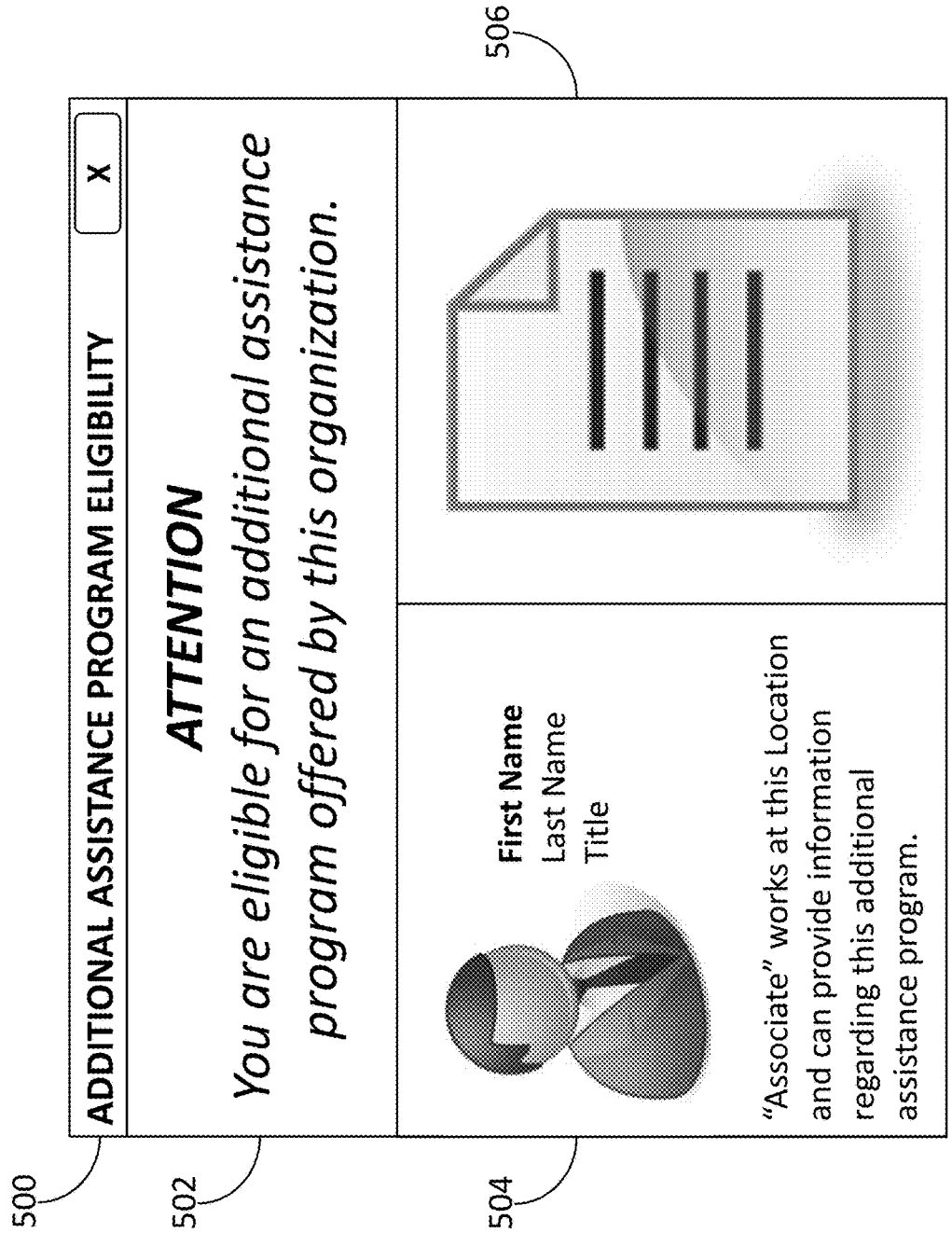
FIG. 5 depicts an example customer message for identifying personnel-staffing adjustments based on indoor positioning system detection of physical customer presence in accordance with one or more example embodiments.

At step 15, computing platform 326 may generate one or more customer messages indicating the physical presence of the customer(s) at the physical location(s) associated with indoor positioning system(s) 304. For example, computing platform 326 may generate a customer message for the customer associated with personal computing device 314 indicating the customer associated with personal computing device 314's physical presence at Location "A." Similarly, computing platform 326 may generate a customer message for the customer associated with personal computing device 320 indicating the customer associated with personal computing device 320's physical presence at Location "B." FIG. 5 depicts an example customer message for identifying personnel-staffing adjustments based on indoor positioning system detection of physical customer presence in accordance with one or more example embodiments. Referring to FIG. 5, message 500 may include indication 502, indicating that the customer (e.g., the customer associated with personal computing device 314 or the customer associated with personal computing device 320) is eligible for the additional assistance program offered by the organization. Message 500 may also include section 504, which may identify an associate of the organization currently located at the physical location (e.g., the associate associated with personal computing device 316 or the associate associated with personal computing device 322) that has been identified to assist the customer with the additional assistance program offered by the organization for which the customer is eligible. Message 500 may also include section 506, which may include information regarding the additional assistance program for which the customer is eligible.

Figure 6:
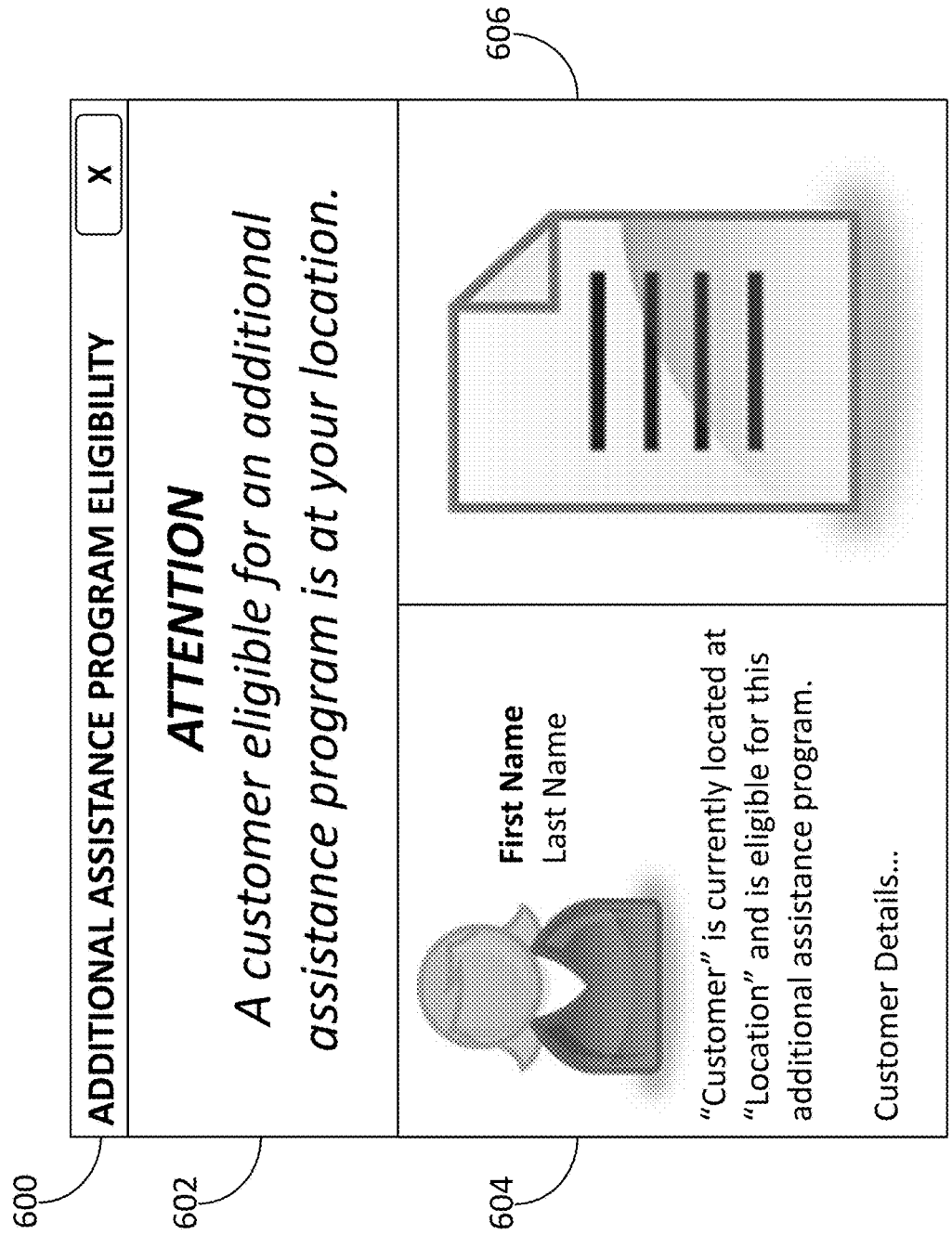
FIG. 6 depicts an example associate message for identifying personnel-staffing adjustments based on indoor positioning system detection of physical customer presence in accordance with one or more example embodiments.

Returning to FIG. 4D, at step 16, computing platform 326 may generate one or more associate messages indicating the physical presence of the customer(s) at the physical location(s) associated with indoor positioning system(s) 304. For example, computing platform 326 may generate an associate message for the associate associated with personal computing device 316 indicating the customer associated with personal computing device 314's physical presence at Location "A." Similarly, computing platform 326 may generate an associate message for the associate associated with personal computing device 322 indicating the customer associated with personal computing device 320's physical presence at Location "B." FIG. 6 depicts an example associate message for identifying personnel-staffing adjustments based on indoor positioning system detection of physical customer presence in accordance with one or more example embodiments. Referring to FIG. 6, message 600 may include indication 602, indicating that the customer (e.g., the customer associated with personal computing device 314 and/or the customer associated with personal computing device 320) is eligible for the additional assistance program offered by the organization. Message 600 may also include section 604, which may identify the customer of the organization currently located at the physical location (e.g., the customer associated with personal computing device 314 and/or the customer associated with personal computing device 320) that has been identified as eligible for the additional assistance program offered by the organization, and/or the location of the customer that has been identified as eligible for the additional assistance program offered by the organization within the location(s) associated with indoor positioning system(s) 304 (e.g., Location "A" or Location "B"). Message 600 may also include section 606, which may include information regarding the additional assistance program for which the customer is eligible.

Returning to FIG. 4D, at step 17, computing platform 326 may identify one or more personal computing devices presently in possession of the customer(s) eligible for the additional assistance program(s) at the physical location(s) associated with indoor positioning system(s) 304. For example, computing platform 326 may identify personal computing device 314 as being presently in the possession of the customer associated with personal computing device 314 based on the message received from personal computing device 314 (e.g., in step 12 above). Similarly, computing platform 326 may identify personal computing device 320 as being presently in the possession of the customer associated with personal computing device 320 based on the message received from personal computing device 320 (e.g., in step 12 above). At step 18, computing platform 326 may identify one or more personal computing devices presently in possession of the associate(s) at the physical location(s) associated with indoor positioning system(s) 304 identified to assist the customer(s) eligible for the additional assistance program(s) at the physical location(s) associated with indoor positioning system(s) 304. For example, computing platform 326 may identify personal computing device 316 as being presently in the possession of the associate associated with personal computing device 316 based on the message received from personal computing device 316 (e.g., in step 12 above). Similarly, computing platform 326 may identify personal computing device 322 as being presently in the possession of the associate associated with personal computing device 322 based on the message received from personal computing device 322 (e.g., in step 12 above).

At step 19, computing platform 326 may communicate (e.g., via communication interface 332 and network(s) 306) the customer message for the customer associated with personal computing device 314 to personal computing device 314. At step 20, computing platform 326 may communicate (e.g., via communication interface 332 and network(s) 306) the customer message for the customer associated with personal computing device 320 to personal computing device 320. At step 21, computing platform 326 may communicate (e.g., via communication interface 332 and network(s) 306) the associate message for the associate associated with personal computing device 316 to personal computing device 316. At step 22, computing platform 326 may communicate (e.g., via communication interface 332 and network(s) 306) the associate message for the associate associated with personal computing device 322 to personal computing device 322.

Figure 7:
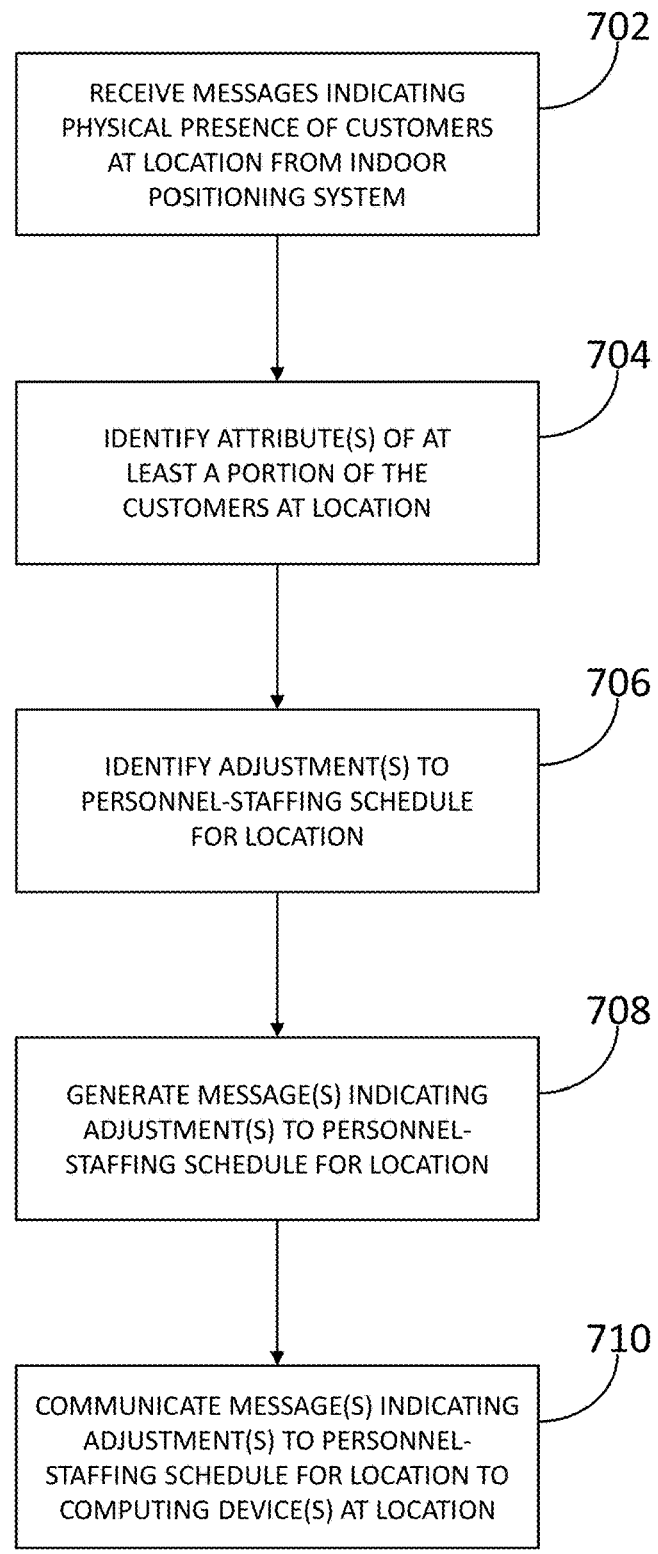
FIG. 7 depicts an illustrative method for identifying personnel-staffing adjustments based on indoor positioning system detection of physical customer presence in accordance with one or more example embodiments.

FIG. 7 depicts an illustrative method for identifying personnel-staffing adjustments based on indoor positioning system detection of physical customer presence in accordance with one or more example embodiments. Referring to FIG. 7, at step 702, a computing platform may receive a plurality of messages comprising data indicating physical presence of a plurality of customers at a physical location from an indoor positioning system located at the physical location. For example, computing platform 326 may receive messages indicating the physical presence of a customer associated with personal computing device 312, a customer associated with personal computing device 314, a customer associated with personal computing device 318, and a customer associated with personal computing device 320, from indoor positioning system(s) 304. At step 704, the computing platform may identify one or more attributes of at least a portion of the customers at the physical location. For example, computing platform 326 may identify one or more shared attributes of the customer associated with personal computing device 314 and the customer associated with personal computing device 320. At step 706, the computing platform may identify one or more adjustments to a personnel-staffing schedule for the physical location based on at least a portion of the data indicating the physical presence of the customers at the physical location and the one or more attributes of the at least a portion of the customers at the physical location. For example, computing platform 326 may identify one or more adjustments to a personnel-staffing schedule for a physical location associated with indoor positioning system(s) 304 (e.g., one or more adjustments associated with the associate associated with personal computing device 316 and/or the associate associated with personal computing device 322) based on the message indicating the physical presence of the customer associated with personal computing device 314, the message indicating the physical presence of the customer associated with personal computing device 320, and the one or more shared attributes of the customer associated with personal computing device 314 and the customer associated with personal computing device 320. At step 708, the computing platform may generate a message indicating the one or more adjustments to the personnel-staffing schedule for the physical location. For example, computing platform 326 may generate one or more messages indicating the adjustment(s) to the personnel-staffing schedule for the physical location associated with indoor positioning system(s) 304 (e.g., the adjustment(s) associated with the associate associated with personal computing device 316 and/or the associate associated with personal computing device 322). At step 710, the computing platform may communicate the message indicating the one or more adjustments to the personnel-staffing schedule for the physical location to a computing device located at the physical location. For example, computing platform 326 may communicate the message(s) indicating the adjustment(s) to the personnel-staffing schedule for the physical location associated with indoor positioning system(s) 304 (e.g., the adjustment(s) associated with the associate associated with personal computing device 316 and/or the associate associated with personal computing device 322) to personal computing device 316 and/or personal computing device 322.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method, comprising:
   at a computing platform comprising at least one processor, a memory, and a communication interface:
      establishing a communications link to an indoor positioning system located at a physical banking center location of a financial institution, the indoor positioning system comprising a plurality of personal computing devices presently in possession of a plurality of customers of the financial institution at the physical banking center location of the financial institution, and at least one location beacon that is located at the physical banking center location of the financial institution and is configured to emit a signal comprising an identifier associated with the physical banking center location, wherein the at least one location beacon is located at a first location of the physical banking center location of the financial institution and the identifier is associated with the first location of the physical banking center location of the financial institution, wherein the first location of the physical banking center location of the financial institution comprises an area associated with one or more automated teller machines of the financial institution, wherein the indoor positioning system comprises a second location beacon that is located at a second location of the physical banking center location of the financial institution and is configured to emit a signal comprising an identifier associated with the second location of the physical banking center location of the financial institution, wherein the second location of the physical banking center location of the financial institution comprises an indoor lobby of the physical banking center location of the financial institution, and wherein receiving a plurality of messages comprising data indicating physical presence of the customers of the financial institution at the physical banking center location of the financial institution comprises:
         receiving messages comprising data indicating physical presence of a portion of the customers of the financial institution at the first location of the physical banking center location of the financial institution; and
         receiving messages comprising data indicating physical presence of a portion of the customers of the financial institution at the second location of the physical banking center location of the financial institution;
      receiving, via the communication interface, over a period of time comprising a plurality of days, and from the indoor positioning system located at the physical banking center location of the financial institution, a plurality of messages comprising data including the identifier associated with the physical banking center location and indicating physical presence of a plurality of customers of the financial institution at the physical banking center location of the financial institution;

responsive to receiving the plurality of messages comprising the data indicating the physical presence of the plurality of customers of the financial institution at the physical banking center location of the financial institution:
  generating, by the at least one processor, a request for profile data for each of the plurality of customers of the financial institution at the physical banking center location of the financial institution, wherein the profile data for each of the plurality of customers of the financial institution comprises an identifier respectively associated with each of the plurality of customers of the financial institution;
  communicating, via the communication interface and to a customer management system of the financial institution, the request for the profile data for each of the plurality of customers of the financial institution at the physical banking center location of the financial institution;
  receiving, via the communication interface and from the customer management system of the financial institution, customer profile data for each of the plurality of customers of the financial institution at the physical banking center location of the financial institution;
identifying, by the at least one processor and based on the customer profile data for each of the plurality of customers of the financial institution at the physical banking center location of the financial institution, one or more attributes of at least a portion of the plurality of customers of the financial institution at the physical banking center location of the financial institution;
identifying, by the at least one processor and based on the customer profile data for each of the plurality of customers of the financial institution at the physical banking center location of the financial institution, one or more shared attributes of at least a portion of the plurality of customers of the financial institution at the physical banking center location of the financial institution; and
identifying, by the at least one processor and based on at least a portion of the data indicating the physical presence of the plurality of customers of the financial institution at the physical banking center location of the financial institution and the one or more attributes of the at least a portion of the plurality of customers of the financial institution at the physical banking center location of the financial institution, one or more adjustments to a personnel-staffing schedule for the physical banking center location of the financial institution.

2. The method of claim 1, comprising:
generating, by the at least one processor, a message indicating the one or more adjustments to the personnel-staffing schedule for the physical banking center location of the financial institution;
identifying, by the at least one processor, a computing device located at the physical banking center location of the financial institution; and
communicating, via the communication interface and to the computing device located at the physical banking center location of the financial institution, the message indicating the one or more adjustments to the personnel-staffing schedule for the physical banking center location of the financial institution.

3. The method of claim 1, comprising:
at least one day subsequent to identifying the one or more adjustments to the personnel-staffing schedule for the physical banking center location of the financial institution, receiving, via the communication interface and from the indoor positioning system located at the physical banking center location of the financial institution, one or more messages comprising data indicating physical presence of one or more customers of the at least a portion of the plurality of customers of the financial institution at the physical banking center location of the financial institution; and
responsive to receiving the one or more messages comprising the data indicating the physical presence of the one or more customers of the at least a portion of the plurality of customers of the financial institution at the physical banking center location of the financial institution:
  generating, by the at least one processor, a message indicating the physical presence of the one or more customers of the at least a portion of the plurality of customers of the financial institution at the physical banking center location of the financial institution;
  identifying, by the at least one processor, at least one computing device located at the physical banking center location of the financial institution; and
  communicating, via the communication interface and to the at least one computing device located at the physical banking center location of the financial institution, the message indicating the physical presence of the one or more customers of the at least a portion of the plurality of customers of the financial institution at the physical banking center location of the financial institution.

4. The method of claim 3, wherein identifying the at least one computing device located at the physical banking center location of the financial institution comprises identifying, based on at least one of the one or more messages comprising the data indicating physical presence of the one or more customers of the at least a portion of the plurality of customers of the financial institution at the physical banking center location of the financial institution, one or more personal computing devices presently in possession of the one or more customers of the at least a portion of the plurality of customers of the financial institution at the physical banking center location of the financial institution, and wherein communicating the message indicating the physical presence of the one or more customers of the at least a portion of the plurality of customers of the financial institution at the physical banking center location of the financial institution comprises communicating, via the communication interface and to the one or more personal computing devices presently in possession of the one or more customers of the at least a portion of the plurality of customers of the financial institution at the physical banking center location of the financial institution, the message indicating the physical presence of the one or more customers of the at least a portion of the plurality of customers of the financial institution at the physical banking center location of the financial institution.

5. The method of claim 3, comprising identifying, based at least in part on the one or more adjustments to the personnel-staffing schedule for the physical banking center location of the financial institution, an associate of the financial institution who is located at the physical banking center location of the financial institution to assist the one or more customers of the at least a portion of the plurality of customers of the financial institution at the physical banking center location of the financial institution.

6. The method of claim 5, wherein identifying the at least one computing device located at the physical banking center location of the financial institution comprises identifying one or more personal computing devices presently in possession of the associate of the financial institution who is located at the physical banking center location of the financial institution, and wherein communicating the message indicating the physical presence of the one or more customers of the at least a portion of the plurality of customers of the financial institution at the physical banking center location of the financial institution comprises communicating, via the communication interface and to the one or more personal computing devices presently in possession of the associate of the financial institution who is located at the physical banking center location of the financial institution, the message indicating the physical presence of the one or more customers of the at least a portion of the plurality of customers of the financial institution at the physical banking center location of the financial institution.

7. The method of claim 6, comprising receiving, via the communication interface and from the indoor positioning system located at the physical banking center location of the financial institution, one or more messages comprising data indicating physical presence of one or more associates of the financial institution at the physical banking center location of the financial institution.

8. The method of claim 7, wherein identifying the one or more personal computing devices presently in possession of the associate of the financial institution who is located at the physical banking center location of the financial institution comprises identifying, by the at least one processor and based on at least one of the one or more messages comprising data indicating physical presence of one or more associates of the financial institution at the physical banking center location of the financial institution, the one or more personal computing devices presently in possession of the associate of the financial institution who is located at the physical banking center location of the financial institution.

9. The method of claim 1, comprising:
determining, by the at least one processor and based on the plurality of messages comprising the data indicating the physical presence of the plurality of customers of the financial institution at the physical banking center location of the financial institution, a plurality of dates and times, each date and time of the plurality of dates and times corresponding to physical presence of a customer of the plurality of customers of the financial institution at the physical banking center location of the financial institution; and
identifying, by the at least one processor and from amongst the plurality of dates and times, a set of dates and times corresponding to physical presence of the at least a portion of the plurality of customers of the financial institution at the physical banking center location of the financial institution.

10. The method of claim 9, wherein identifying the one or more adjustments to the personnel-staffing schedule for the physical banking center location of the financial institution comprises identifying, by the at least one processor and based on the set of dates and times corresponding to physical presence of the at least a portion of the plurality of customers of the financial institution at the physical banking center location of the financial institution, one or more adjustments to the personnel-staffing schedule for the physical banking center location of the financial institution that adjust the personnel-staffing schedule for the physical banking center location of the financial institution for at least one date or time corresponding to a date or time from amongst the set of dates and times corresponding to physical presence of the at least a portion of the plurality of customers of the financial institution at the physical banking center location of the financial institution.

11. The method of claim 1, wherein identifying the one or more attributes of the at least a portion of the plurality of customers of the financial institution at the physical banking center location of the financial institution comprises identifying one or more attributes of the portion of the customers of the financial institution at the first location of the physical banking center location of the financial institution and one or more attributes of the portion of the customers of the financial institution at the second location of the physical banking center location of the financial institution, and wherein identifying the one or more adjustments to the personnel-staffing schedule for the physical banking center location of the financial institution comprises identifying one or more adjustments to a personnel-staffing schedule for the first location of the physical banking center location of the financial institution and one or more adjustments to a personnel-staffing schedule for the second location of the physical banking center location of the financial institution.

12. The method of claim 1, wherein the profile data for each of the plurality of customers of the financial institution comprises an attribute of the one or more attributes of the at least a portion of the plurality of customers of the financial institution at the physical banking center location of the financial institution.

13. The method of claim 1, comprising:
sending a message to a personal computing device of the plurality of personal computing devices presently in possession of the plurality of customers of the financial institution at the physical banking center location of the financial institution, the message comprising an indication that a customer of the plurality of customers of the financial institution at the physical banking center location of the financial institution is eligible for a program offered by the financial institution.

14. The method of claim 1, wherein the one or more attributes of the at least a portion of the plurality of customers of the financial institution at the physical banking center location of the financial institution comprise ages of the at least a portion of the plurality of customers of the financial institution at the physical banking center location of the financial institution.

15. An apparatus, comprising:
at least one processor;
a communication interface; and
a memory storing instructions that when executed by the at least one processor cause the apparatus to:
establish a communications link to an indoor positioning system located at a physical banking center location of a financial institution, the indoor positioning system comprising a plurality of personal computing devices presently in possession of a plurality of customers of the financial institution at the physical banking center location of the financial institution, and at least one location beacon that is located at the physical banking center location of the financial institution and is configured to emit a signal comprising an identifier associated with the physical banking center location, wherein the at least one location beacon is located at a first location of the physical banking center location of the financial institution and the identifier is associated with the first location of the physical banking center location of the financial institution, wherein the first location of the physical banking center location of the financial institution comprises an area associated with one or more automated teller machines of the financial institution, wherein the indoor positioning system comprises a second location beacon that is located at a second location of the physical banking center location of the financial institution and is configured to emit a signal comprising an identifier associated with the second location of the physical banking center location of the financial institution, wherein the second location of the physical banking center location of the financial institution comprises an indoor lobby of the physical banking center location of the financial institution, and wherein receiving a plurality of messages comprising data indicating physical presence of the customers of the financial institution at the physical banking center location of the financial institution comprises:

receiving messages comprising data indicating physical presence of a portion of the customers of the financial institution at the first location of the physical banking center location of the financial institution; and receiving messages comprising data indicating physical presence of a portion of the customers of the financial institution at the second location of the physical banking center location of the financial institution;

receive, via the communication interface, over a period of time comprising a plurality of days, and from the indoor positioning system located at the physical banking center location of the financial institution, a plurality of messages comprising data including the identifier associated with the physical banking center location and indicating physical presence of a plurality of customers of the financial institution at the physical banking center location of the financial institution;

responsive to receiving the plurality of messages comprising the data indicating the physical presence of the plurality of customers of the financial institution at the physical banking center location of the financial institution:

generate a request for profile data for each of the plurality of customers of the financial institution at the physical banking center location of the financial institution, wherein the profile data for each of the plurality of customers of the financial institution comprises an identifier respectively associated with each of the plurality of customers of the financial institution;

communicate, to a customer management system of the financial institution, the request for the profile data for each of the plurality of customers of the financial institution at the physical banking center location of the financial institution;

receive, from the customer management system of the financial institution, customer profile data for each of the plurality of customers of the financial institution at the physical banking center location of the financial institution;

identify, based on the customer profile data for each of the plurality of customers of the financial institution at the physical banking center location of the financial institution, one or more attributes of at least a portion of the plurality of customers of the financial institution at the physical banking center location of the financial institution;

identify, based on the customer profile data for each of the plurality of customers of the financial institution at the physical banking center location of the financial institution, one or more shared attributes of at least a portion of the plurality of customers of the financial institution at the physical banking center location of the financial institution;

identify, based on at least a portion of the data indicating the physical presence of the plurality of customers of the financial institution at the physical banking center location of the financial institution and the one or more attributes of the at least a portion of the plurality of customers of the financial institution at the physical banking center location of the financial institution, one or more adjustments to a personnel-staffing schedule for the physical banking center location of the financial institution;

generate a message indicating the one or more adjustments to the personnel-staffing schedule for the physical banking center location of the financial institution;

identify a computing device located at the physical banking center location of the financial institution; and communicate, via the communication interface and to the computing device located at the physical banking center location of the financial institution, the message indicating the one or more adjustments to the personnel-staffing schedule for the physical banking center location of the financial institution.

16. One or more non-transitory computer-readable media having instructions stored thereon that when executed by one or more computers cause the one or more computers to:

establish a communications link to an indoor positioning system located at a physical banking center location of a financial institution, the indoor positioning system comprising a plurality of personal computing devices presently in possession of a plurality of customers of the financial institution at the physical banking center location of the financial institution, and at least one location beacon that is located at the physical banking center location of the financial institution and is configured to emit a signal comprising an identifier associated with the physical banking center location, wherein the at least one location beacon is located at a first location of the physical banking center location of the financial institution and the identifier is associated with the first location of the physical banking center location of the financial institution, wherein the first location of the physical banking center location of the financial institution comprises an area associated with one or more automated teller machines of the financial institution, wherein the indoor positioning system comprises a second location beacon that is located at a second location of the physical banking center location of the financial institution and is configured to emit a signal comprising an identifier associated with the second location of the physical banking center location of the financial institution, wherein the second location of the physical banking center location of the financial institution comprises an indoor lobby of the physical banking center location of the financial institution, and wherein receiving a plurality of messages comprising data indicating physical presence of the customers of the financial institution at the physical banking center location of the financial institution comprises:
  receiving messages comprising data indicating physical presence of a portion of the customers of the financial institution at the first location of the physical banking center location of the financial institution; and
  receiving messages comprising data indicating physical presence of a portion of the customers of the financial institution at the second location of the physical banking center location of the financial institution;
receive, from the indoor positioning system located at the physical banking center location of the financial institution, a plurality of messages comprising data including the identifier associated with the physical banking center location and indicating physical presence of a plurality of customers of the financial institution at the physical banking center location of the financial institution;
responsive to receiving the plurality of messages comprising the data indicating the physical presence of the plurality of customers of the financial institution at the physical banking center location of the financial institution:
  generate a request for profile data for each of the plurality of customers of the financial institution at the physical banking center location of the financial institution, wherein the profile data for each of the plurality of customers of the financial institution comprises an identifier respectively associated with each of the plurality of customers of the financial institution;
  communicate, to a customer management system of the financial institution, the request for the profile data for each of the plurality of customers of the financial institution at the physical banking center location of the financial institution;
  receive, from the customer management system of the financial institution, customer profile data for each of the plurality of customers of the financial institution at the physical banking center location of the financial institution;
  identify, based on the customer profile data for each of the plurality of customers of the financial institution at the physical banking center location of the financial institution, one or more attributes of at least a portion of the plurality of customers of the financial institution at the physical banking center location of the financial institution;
  identify, based on the customer profile data for each of the plurality of customers of the financial institution at the physical banking center location of the financial institution, one or more shared attributes of at least a portion of the plurality of customers of the financial institution at the physical banking center location of the financial institution;
  identify, based on at least a portion of the data indicating the physical presence of the plurality of customers of the financial institution at the physical banking center location of the financial institution and the one or more attributes of the at least a portion of the plurality of customers of the financial institution at the physical banking center location of the financial institution, one or more adjustments to a personnel-staffing schedule for the physical banking center location of the financial institution;
  subsequent to identifying the one or more adjustments to the personnel-staffing schedule for the physical banking center location of the financial institution, receive, from the indoor positioning system located at the physical banking center location of the financial institution, one or more messages comprising data indicating physical presence of one or more customers of the at least a portion of the plurality of customers of the financial institution at the physical banking center location of the financial institution; and
  responsive to receiving the one or more messages comprising the data indicating the physical presence of the one or more customers of the at least a portion of the plurality of customers of the financial institution at the physical banking center location of the financial institution:
    generate a message indicating the physical presence of the one or more customers of the at least a portion of the plurality of customers of the financial institution at the physical banking center location of the financial institution;
    identify at least one computing device located at the physical banking center location of the financial institution; and
    communicate, to the at least one computing device located at the physical banking center location of the financial institution, the message indicating the physical presence of the one or more customers of the at least a portion of the plurality of customers of the financial institution at the physical banking center location of the financial institution.

* * * * *